United States Patent
Lee

(10) Patent No.: US 9,563,294 B2
(45) Date of Patent: Feb. 7, 2017

(54) METHOD OF OPERATING A TOUCH PANEL, TOUCH PANEL AND DISPLAY DEVICE

(71) Applicant: Ji-Gong Lee, Yongin (KR)

(72) Inventor: Ji-Gong Lee, Yongin (KR)

(73) Assignee: Samsung Display Co., Ltd., Yongin, Gyunggi-do (KR)

( * ) Notice: Subject to any disclaimer, the term of this patent is extended or adjusted under 35 U.S.C. 154(b) by 180 days.

(21) Appl. No.: 13/683,368

(22) Filed: Nov. 21, 2012

(65) Prior Publication Data

US 2013/0215049 A1 Aug. 22, 2013

(30) Foreign Application Priority Data

Feb. 16, 2012 (KR) .................. 10-2012-0015783

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0416* (2013.01); *G06F 2203/04104* (2013.01); *G06F 2203/04112* (2013.01)

(58) Field of Classification Search
CPC .... G06F 3/041; G06F 2203/041; G06F 3/044; G06F 1/3262; G06F 1/3215; G06F 3/045; G06F 3/046
USPC ................. 345/173, 156; 178/18.06
See application file for complete search history.

(56) References Cited

U.S. PATENT DOCUMENTS

| | | | |
|---|---|---|---|
| 7,812,827 B2 * | 10/2010 | Hotelling | G06F 3/0416 345/156 |
| 8,581,874 B2 | 11/2013 | Brand et al. | |
| 8,797,363 B2 | 8/2014 | Kim | |
| 9,019,209 B2 | 4/2015 | Geaghan | |
| 2008/0168403 A1 * | 7/2008 | Westerman | G06F 3/04883 715/863 |
| 2009/0066665 A1 * | 3/2009 | Lee | G06F 3/0416 345/173 |
| 2009/0251434 A1 | 10/2009 | Rimon et al. | |
| 2010/0026660 A1 * | 2/2010 | Kitamura | G06F 3/044 345/174 |

(Continued)

FOREIGN PATENT DOCUMENTS

CN  101194221 A   6/2008
CN  101553863 A  10/2009

(Continued)

OTHER PUBLICATIONS

European Office Action dated Feb. 8, 2016.
Japanese Office Action dated May 24, 2016.
Chinese Office Action dated Sep. 20, 2016.

*Primary Examiner* — Andrew Sasinowski
*Assistant Examiner* — Chineyere Wills-Burns
(74) *Attorney, Agent, or Firm* — Lee & Morse, P.C.

(57) ABSTRACT

A method of operating a touch panel including a plurality of driving lines and a plurality of sensing lines includes performing a first limited scan by activating only a first portion of the plurality of driving lines and only a first portion of the plurality of sensing lines, such that a first coarse position of a first touch by a user is detected, and performing a first local scan by activating only driving lines and sensing lines adjacent to the detected first coarse position of the first touch, such that a first fine position of the first touch by the user is detected.

18 Claims, 25 Drawing Sheets

(56) References Cited

U.S. PATENT DOCUMENTS

| | | | |
|---|---|---|---|
| 2010/0110040 A1* | 5/2010 | Kim | G06F 3/0412 345/174 |
| 2010/0156805 A1 | 6/2010 | Brand et al. | |
| 2010/0309171 A1* | 12/2010 | Hsieh et al. | 345/204 |
| 2011/0025629 A1 | 2/2011 | Grivna et al. | |
| 2011/0157068 A1* | 6/2011 | Parker et al. | 345/174 |
| 2011/0181544 A1* | 7/2011 | Lee | G06F 3/042 345/174 |
| 2012/0050216 A1* | 3/2012 | Kremin | G06F 3/044 345/174 |
| 2012/0154324 A1* | 6/2012 | Wright et al. | 345/174 |
| 2012/0242597 A1* | 9/2012 | Hwang | G06F 3/0412 345/173 |
| 2013/0215049 A1 | 8/2013 | Lee | |

FOREIGN PATENT DOCUMENTS

| | | |
|---|---|---|
| CN | 102257458 A | 11/2011 |
| CN | 203133786 U | 8/2013 |
| JP | 2009-289235 A | 12/2009 |
| JP | 2010-039602 A | 2/2010 |
| JP | 2011-242908 | 12/2011 |
| JP | 2013-045209 | 3/2013 |
| KR | 10-2000-0039893 A | 7/2000 |
| KR | 10-2009-0027066 A | 3/2009 |
| KR | 10-2010-0048236 A | 5/2010 |
| KR | 10-2011-0062811 A | 6/2011 |

\* cited by examiner

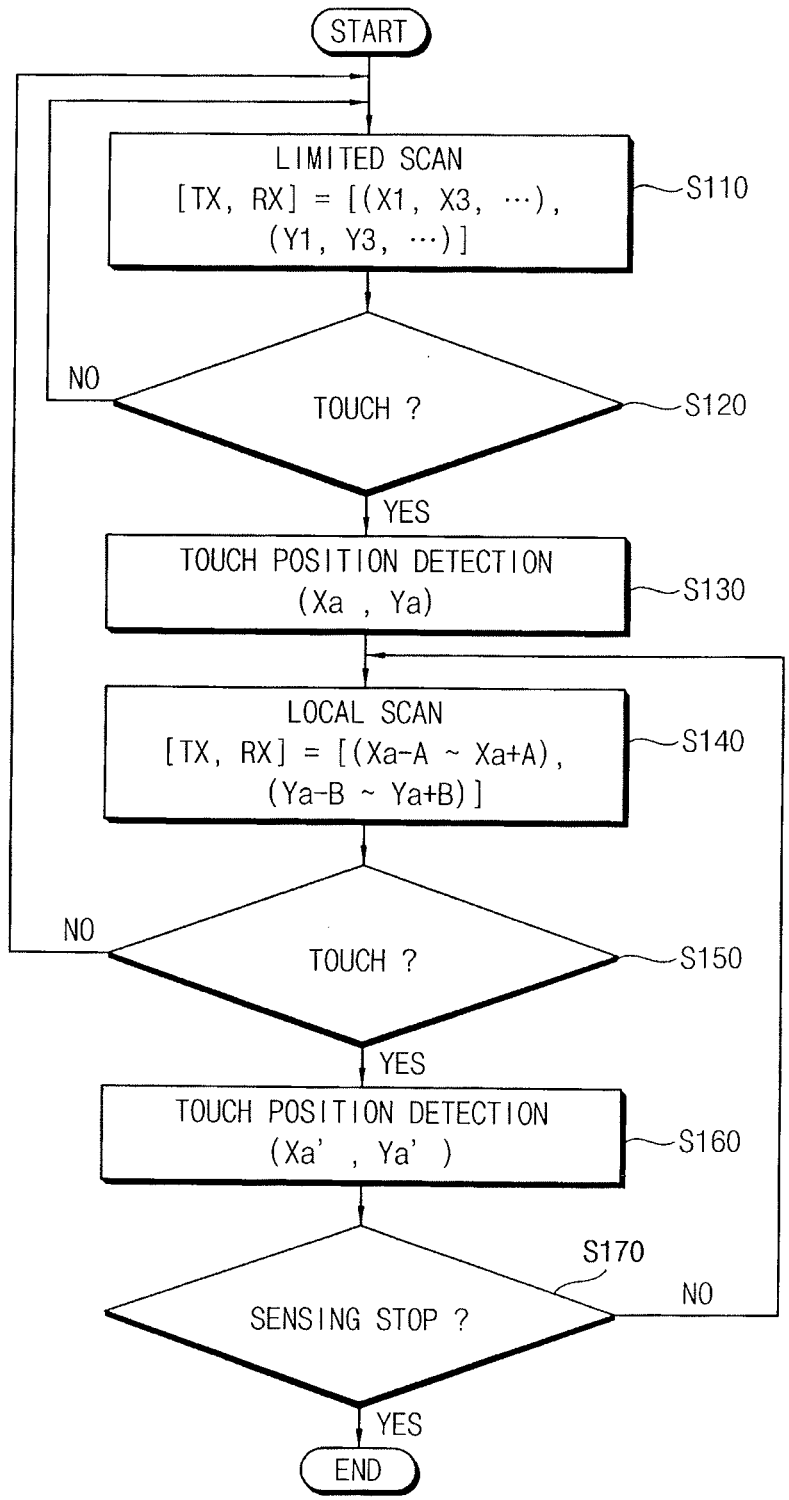

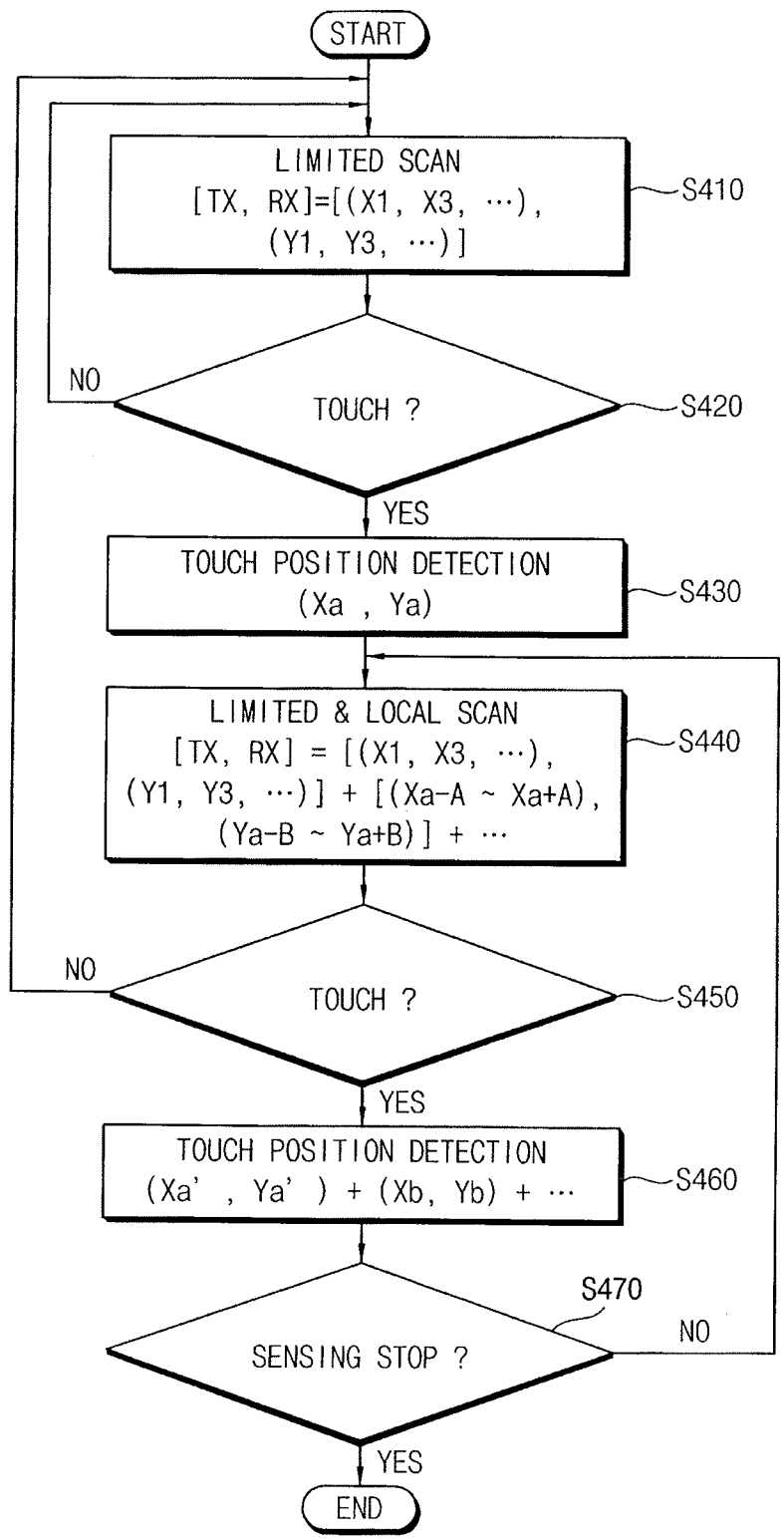

METHOD OF OPERATING A TOUCH PANEL, TOUCH PANEL AND DISPLAY DEVICE

BACKGROUND

1. Field

Example embodiments of the inventive concept relate to touch panels. More particularly, example embodiments of the inventive concept relate to methods of operating touch panels, the touch panels and display devices.

2. Description of the Related Art

A touch panel (or a touch screen) is widely used in electronic devices to detect an input action or an event by a user. Typically, the touch panel may detect the presence and location of a touch by the user by generating an electrical signal when the touch panel is touched by a finger, a stylus pen, or the like. The touch panel may be mounted on a display panel, e.g., an organic light emitting diode (OLED) display panel, a liquid crystal display (LCD) panel, etc., or may be formed within the display panel. The touch panel may be classified into, e.g., a resistive touch panel, a capacitive touch panel, an electromagnetic touch panel, an infrared touch panel, a surface acoustic wave (SAW) touch panel, a near field imaging (NFI) touch panel, etc.

A conventional touch panel detects a touch by the user by scanning all touch points included in the touch panel. As a display device and the touch panel included in the display device become larger, the number of touch points included in the touch panel increases, and thus, power consumption and scan time of the touch panel increases.

SUMMARY

Example embodiments provide a method of operating a touch panel capable of reducing scan time and power consumption of the touch panel.

Example embodiments also provide a touch panel with reduced scan time and power consumption thereof.

Example embodiments also provide a display device including a touch panel with reduced scan time and power consumption.

According to one aspect of example embodiments, there is provided a method of operating a touch panel including a plurality of driving lines and a plurality of sensing lines, the method including performing a first limited scan by activating only a first portion of the plurality of driving lines and only a first portion of the plurality of sensing lines, such that a first coarse position of a first touch by a user is detected, and performing a first local scan by activating only driving lines and sensing lines adjacent to the detected first coarse position of the first touch, such that a first fine position of the first touch by the user is detected.

Performing the first limited scan may include activating M driving lines of N driving lines among the plurality of driving lines, where N is an integer greater than 1, and M is an integer greater than 0 and smaller than N, and activating K sensing lines of L sensing lines among the plurality of sensing lines, where L is an integer greater than 1, and K is an integer greater than 0 and smaller than L.

Performing the first limited scan may include activating only odd-numbered driving lines among the plurality of driving lines, and activating only odd-numbered sensing lines among the plurality of sensing lines.

Performing the first limited scan may include activating only even-numbered driving lines among the plurality of driving lines, and activating only even-numbered sensing lines among the plurality of sensing lines.

Performing the first limited scan may include activating only odd-numbered driving lines among the plurality of driving lines in an odd-numbered touch frame, activating only odd-numbered sensing lines among the plurality of sensing lines in the odd-numbered touch frame, activating only even-numbered driving lines among the plurality of driving lines in an even-numbered touch frame, and activating only even-numbered sensing lines among the plurality of sensing lines in the even-numbered touch frame.

Performing the first local scan may include activating a first driving line corresponding to the first coarse position of the first touch and at least one second driving line adjacent to the first driving line among the plurality of driving lines, and activating a first sensing line corresponding to the first coarse position of the first touch and at least one second sensing line adjacent to the first sensing line among the plurality of sensing lines.

The method may further include performing a second local scan subsequent to the first local scan by activating driving lines and sensing lines adjacent to the first fine position of the first touch, such that a changed fine position of the first touch is detected.

Performing the second local scan may detect a drag operation of the user.

The method may further include performing subsequent second limited and local scans, after a period of sensing no touch, such that a second touch at a second position spaced apart from the first position is determined.

The method may further comprising performing a second limited scan simultaneously with the first local scan to detect a second coarse position simultaneously with the first fine position by further activating a second portion of the driving lines and a second portion of the sensing lines.

Performing the first limited scan may include activating M driving lines of N driving lines among the plurality of driving lines, where N is an integer greater than 1, and M is an integer greater than 0 and smaller than N, and activating K sensing lines of L sensing lines among the plurality of sensing lines, where L is an integer greater than 1, and K is an integer greater than 0 and smaller than L.

Performing the simultaneous limited and local scans may include activating the second portion of the plurality of driving lines, a first driving line corresponding to the first coarse position of the first touch, and at least one second driving line adjacent to the first driving line among the plurality of driving lines, and activating the second portion of the plurality of sensing lines, a first sensing line corresponding to the first coarse position of the first touch, and at least one second sensing line adjacent to the first sensing line among the plurality of sensing lines.

The method may further include performing a third limited scan simultaneously with a second local scan to detect a third coarse position simultaneously with a second fine position by further activating driving lines adjacent to the second coarse position, a third portion of the driving lines, sensing lines adjacent to the second coarse position, and a third portion of the sensing lines.

Performing the third limited scan simultaneously with the second local scan may include sensing a multi-touch of the first touch and the second touch.

According to another aspect of example embodiments, there is also provided a touch panel, including a plurality of driving lines extending in a first direction, and a plurality of sensing lines extending in a second direction substantially perpendicular to the first direction, wherein the touch panel is configured to activate only a portion of the plurality of driving lines and only a portion of the plurality of sensing lines to perform a first limited scan detecting a coarse position of a touch by a user by, and wherein the touch panel is configured to activate only driving and sensing lines adjacent to the coarse position of the touch to perform a first local scan detecting a fine position of the touch.

The touch panel may be configured to perform a second limited scan simultaneously with the first local scan to detect a second coarse position simultaneously with the fine position by further activating a second portion of the driving lines and a second portion of the sensing lines.

A display device, including a display panel configured to display an image, a display driver configured to drive the display panel, the touch panel as claimed in claim 15, and a touch controller configured to drive the touch panel.

The display driver and the touch controller may be separate chips.

The display driver and the touch controller may be in a single chip.

The touch controller may include a transmitting block configured to apply a driving pulse to the plurality of driving lines, and a receiving block configured to receive outputs from the plurality of sensing lines, the transmitting block of the touch controller being within the display driver.

The touch controller may be configured to control the touch panel to perform a second limited scan simultaneously with the first local scan to detect a second coarse position simultaneously with the fine position by further activating a second portion of the driving lines and a second portion of the sensing lines.

According to another aspect of example embodiments, there is also provided a display device, including a display panel configured to display an image, a display driver configured to drive the display panel, a touch panel including a plurality of sensing blocks configured to operate independently of each other, the touch panel being configured to sense a touch by a user, and a touch controller configured to drive the touch panel, wherein the touch controller is configured to control the touch panel, such that a portion of the plurality of sensing blocks is configured to perform a limited scan that detects a coarse position of a touch in each touch frame, and wherein the touch controller is configured to control the touch panel, such that one of the plurality of sensing blocks having sensed the touch performs a local scan that detects a fine position of the touch.

The touch controller may be configured to sequentially activate the plurality of sensing blocks to have one of the plurality of sensing blocks perform the limited scan in each touch frame.

According to another aspect of example embodiments, there is also provided a method of operating a touch panel including a plurality of touch sensor cells arranged in a matrix form having a plurality of rows and a plurality of columns, the method including performing a first limited scan that detects a first coarse position of a first touch by a user by activating a portion of the plurality of touch sensor cells, and performing a first local scan that detects a first fine position of the first touch by activating touch sensor cells adjacent to the first coarse position of the first touch among the plurality of touch sensor cells.

The method may further include performing a second limited scan simultaneously with the first local scan, such that a second coarse position of a second touch by the user is detected simultaneously with the first fine position, by further activating a portion of the touch sensor cells with the touch sensor cells adjacent to the first coarse position of the first touch.

According to another aspect of example embodiments, there is also provided a method of operating a touch panel including a plurality of driving lines and a plurality of sensing lines, the method including receiving information about a region receiving an input of a user from an external host, and performing a local scan that detects a position of a touch by the user by activating a portion of the plurality of driving lines and a portion of the plurality of sensing lines corresponding to the region receiving the input based on the information about the region receiving the input.

The region receiving the input may be a region where a user interface is displayed.

The information about the region receiving the input may include driving line information that represents at least one driving line located at the region receiving the input and sensing line information that represents at least one sensing line located at the region receiving the input.

BRIEF DESCRIPTION OF THE DRAWINGS

Features will become apparent to those of ordinary skill in the art by describing in detail exemplary embodiments with reference to the attached drawings, in which:

FIG. 1 illustrates a flow chart of a method of operating a touch panel in accordance with example embodiments;

FIG. 7 illustrates a flow chart of a method of operating a touch panel in accordance with example embodiments;

DETAILED DESCRIPTION

Figure 2A:
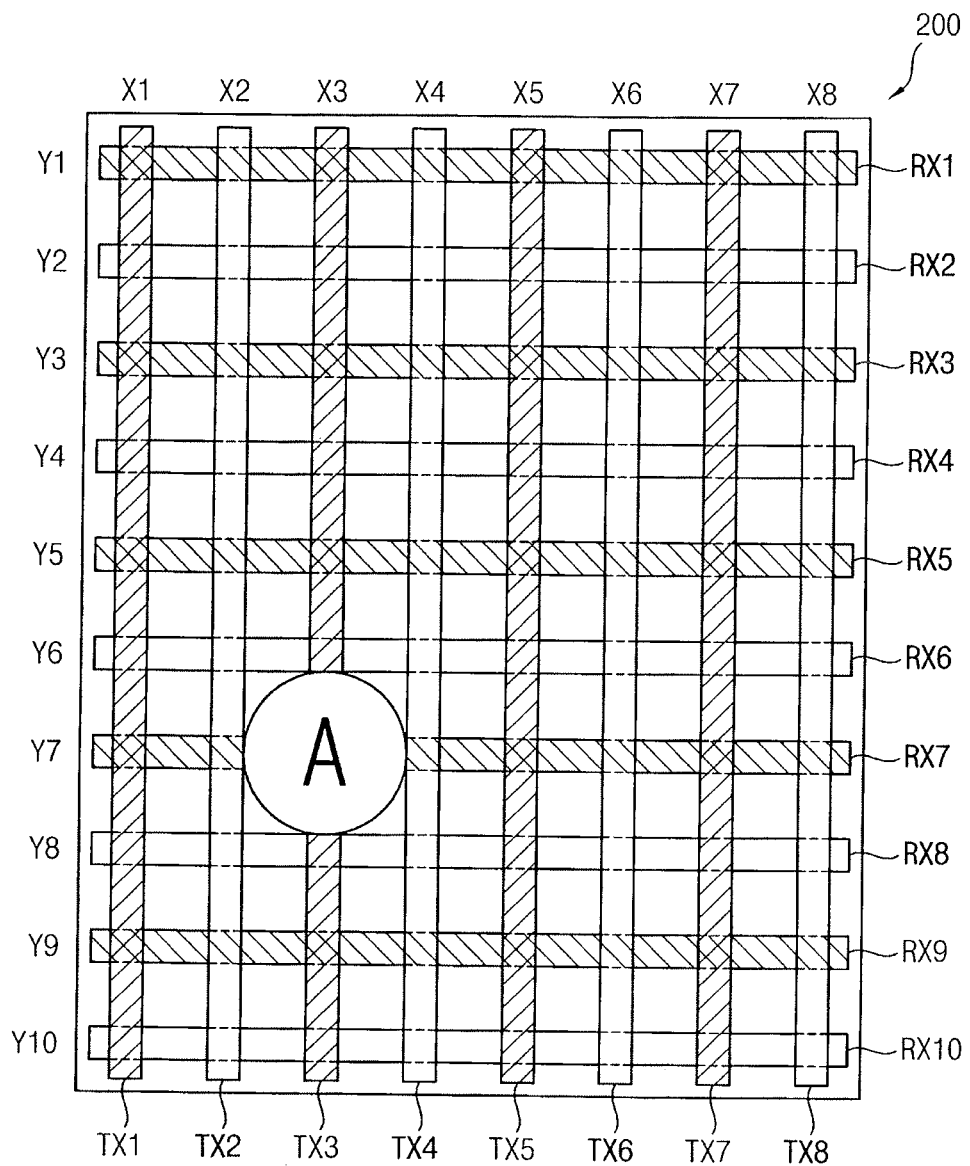
FIGS. 2A and 2B illustrate diagrams of an example of an operation of a touch panel in accordance with example embodiments.

Korean Patent Application No. 10-2012-0015783, filed on Feb. 16, 2012, in the Korean Intellectual Property Office, and entitled: "Method of Operating A Touch Panel, Touch Panel and Display Device," is incorporated by reference herein in its entirety.

Example embodiments are described more fully hereinafter with reference to the accompanying drawings. The inventive concept may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flow chart illustrating a method of operating a touch panel in accordance with example embodiments.

Referring to FIG. 1, a touch panel may perform a rare scan, e.g., a limited scan, that detects a coarse position, e.g., an approximate position, of a touch by a user by activating a first portion of a plurality of driving lines and a first portion of a plurality of sensing lines (S110). That is, during the limited scan, only a portion of the plurality of driving lines and only a portion of the plurality of sensing lines may be activated, while the remaining plurality of driving lines and the remaining plurality of sensing lines may be deactivated or skipped in each touch frame. The portion of the plurality of driving lines activated during the limited scan may be any one or more driving lines, and the portion of the plurality of sensing lines activated during the limited scan may be any one or more sensing lines.

For example, during the limited scan, the touch panel may activate M driving lines out of a total of N driving lines, and may activate K sensing lines out of a total of L sensing lines, where N is an integer greater than 1, M is an integer greater than 0 and smaller than N, L is an integer greater than 1, and K is an integer greater than 0 and smaller than L. In another example, during the limited scan, the touch panel may activate odd-numbered (or even-numbered) driving lines and odd-numbered (or even-numbered) sensing lines. In still another example, the portion of the plurality of driving lines and the portion of the plurality of sensing lines activated during the limited scan may be changed per touch frame, e.g., the touch panel may activate the odd-numbered driving lines and the odd-numbered sensing lines in odd-numbered touch frames, and may activate the even-numbered driving lines and the even-numbered sensing lines in even-numbered touch frames.

In some example embodiments, the touch panel may operate in synchronization with a vertical synchronization signal (VSYNC) and/or a horizontal synchronization signal (HSYNC) for a display panel, and a period of the touch frame for the touch panel may be the same as (or in proportion to) a period of a display frame for the display panel. The occurrence and the coarse position of the touch may be detected by the limited scan.

If it is determined by the limited scan that the touch does not occur (S120: NO), the limited scan may be performed again (S110). If the touch is sensed by the limited scan (S120: YES), the touch panel may detect the coarse position of the touch (S130).

Once the coarse position of the touch is detected, the touch panel may perform a local scan that detects a fine position, e.g., a precise position, of the touch by activating driving lines and sensing lines near the coarse position of the touch among the plurality of driving lines and the plurality of sensing lines (S140). In some example embodiments, to perform the local scan, the touch panel may activate a first driving line corresponding to the coarse position and at least one second driving line adjacent to the first driving line, and may activate a first sensing line corresponding to the coarse position and at least one second sensing line adjacent to the first sensing line. The first driving line corresponding to the coarse position may be a driving line at a horizontal coordinate of the coarse position, and the first sensing line corresponding to the coarse position may be a sensing line at a vertical coordinate of the coarse position.

For example, in a case where the coarse position of the touch is "(Xa, Ya)", the touch panel may activate (Xa−A)-th through (Xa+A)-th driving lines, i.e., an Xa-th driving line corresponding to the coarse position and (Xa−A)-th through (Xa−1)-th and (Xa+1)-th through (Xa+A)-th driving lines adjacent to each side of the Xa-th driving line, where A is an integer greater than 0. Similarly, the touch panel may activate (Ya−B)-th through (Ya+B)-th sensing lines, i.e., an Yb-th sensing line corresponding to the coarse position and (Yb−B)-th through (Yb−1)-th and (Yb+1)-th through (Yb+B)-th sensing lines adjacent to each side of the Yb-th sensing line, where B is an integer greater than 0.

If the touch is sensed by the local scan (S150: YES), the touch panel may detect the fine position of the touch (S160). Therefore, according to example embodiments, the touch panel may detect the coarse position (e.g., (Xa, Ya)) of the touch with low resolution by performing the limited scan, and may detect the fine position (e.g., (Xa', Ya')) of the touch with high resolution by performing the local scan. If a sensing operation of the touch panel is not stopped (S170: NO), the local scan may be performed again (S140).

If the touch is not sensed by the local scan (S150: NO), the touch panel may perform the limited scan again (S110). While the touch panel performs the sensing operation, the touch panel may receive a request (for example, from a host) to stop the sensing operation (S170: YES), and may stop the sensing operation in response to the request.

As described above, in the method of operating the touch panel according to example embodiments, the touch panel may detect a coarse position of a touch with low resolution by performing a limited scan, and subsequently, may detect a fine position of the touch with high resolution by performing a local scan. Accordingly, since only a portion of the driving lines and a only portion of the sensing lines are activated during each of the limited scan and the local scan, scan time and power consumption of the touch panel according to example embodiments may be substantially reduced compared with those of a conventional touch panel, e.g., where all the driving lines and all sensing lines are activated in each touch frame. For example, a conventional method of operating a touch panel may be rarely applied to a large display device because of a long scan time of the touch panel. However, the method of operating the touch panel according to example embodiments may provide reduced scan time of a touch panel, thereby facilitating operation of a large display device with a large number of driving lines and sensing lines.

Figure 2B:
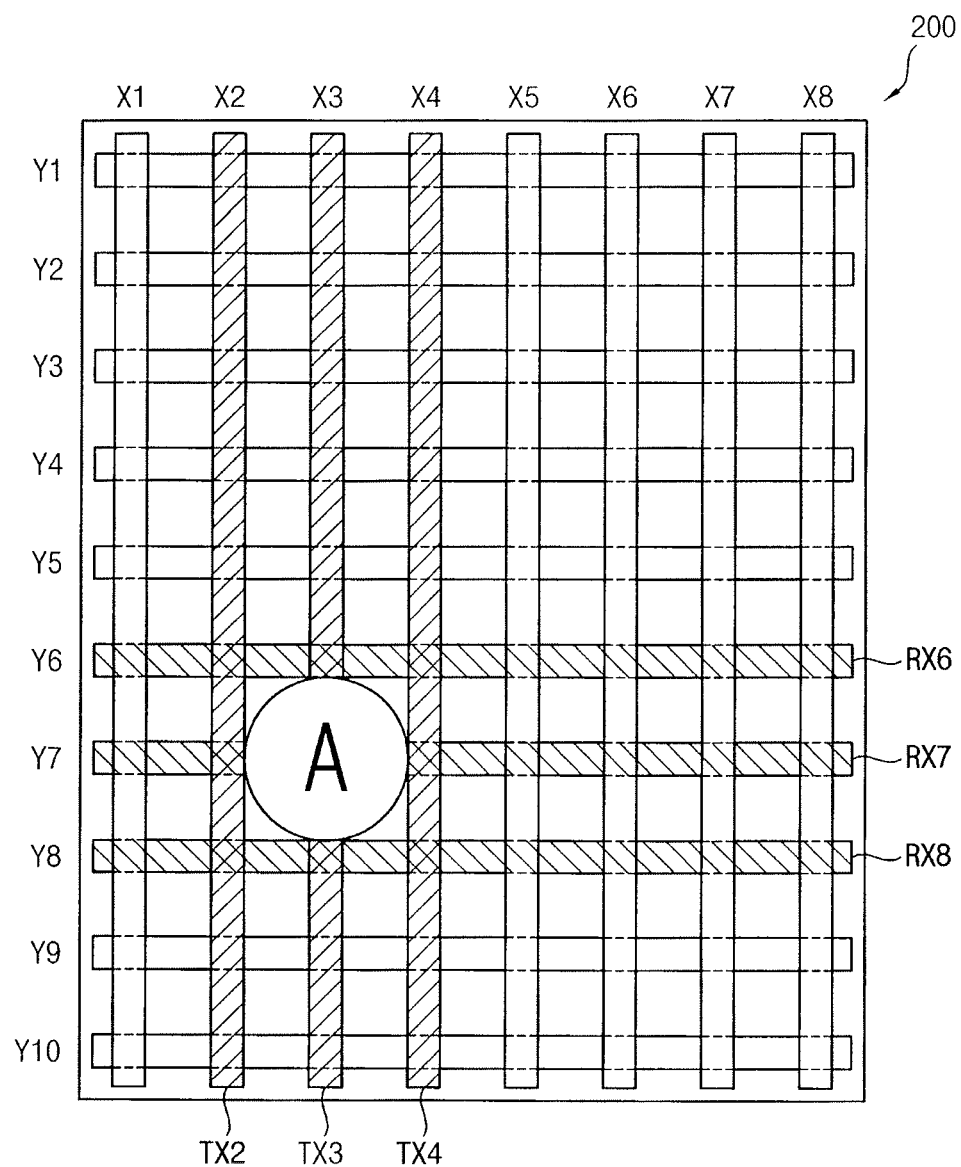
Figure 3A:
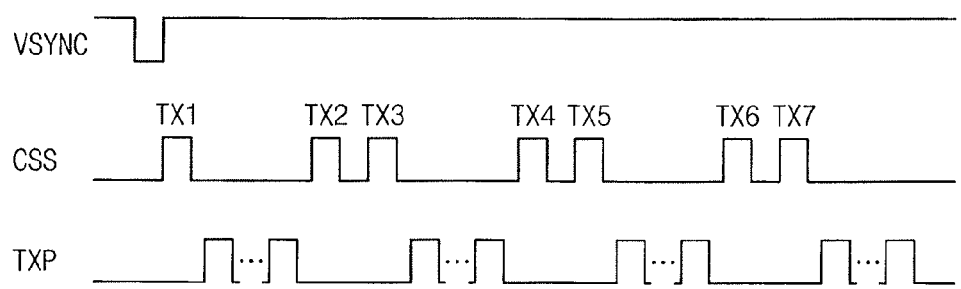
FIGS. 3A and 3B illustrate timing diagrams of an example of an operation of a touch panel in accordance with example embodiments.
Figure 3B:
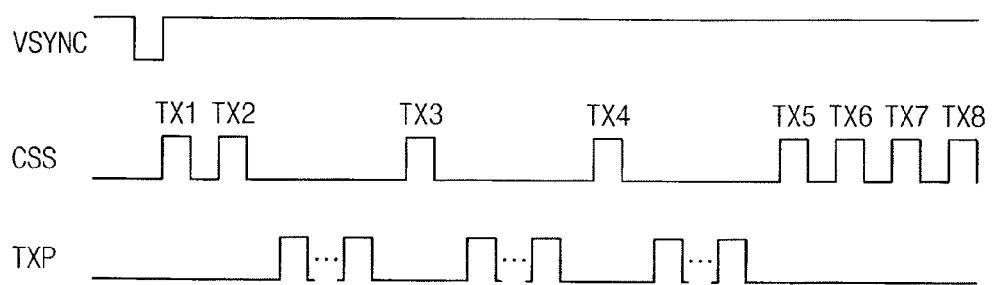

FIGS. 2A and 2B are diagrams illustrating an example of an operation of a touch panel in accordance with example embodiments, and FIGS. 3A and 3B are timing diagrams for describing an operation of a touch panel in accordance with example embodiments.

Referring to FIG. 2A, a touch panel 200 may include a plurality of driving lines TX1, TX2, TX3, TX4, TX5, TX6, TX7 and TX8 extending in a first direction, and a plurality of sensing lines RX1, RX2, RX3, RX4, RX5, RX6, RX7, RX8, RX9 and RX10 extending in a second direction substantially perpendicular to the first direction. For example, the first direction may be a vertical direction, and the second direction may be a horizontal direction. Although FIG. 2A illustrates an example of the touch panel 200 using a rectangular coordinate system including horizontal positions X1, X2, X3, X4, X5, X6, X7 and X8, and vertical positions Y1, Y2, Y3, Y4, Y5, Y6, Y7, Y8, Y9 and Y10, according to example embodiments, the touch panel 200 may use any coordinate system. For example, the touch panel 200 may use a polar coordinate system, e.g., the driving lines may extend in a radial direction and the sensing lines may extend in an angular direction, or vice versa.

In some example embodiments, the touch panel 200 may operate in synchronization with a vertical synchronization signal (VSYNC) and/or a horizontal synchronization signal (HSYNC) for a display panel. For example, to reduce a display noise, the touch panel 200 may perform a sensing operation during a porch period in which display data are not transferred before and/or after the vertical synchronization signal.

If the sensing operation of the touch panel 200 is initiated, the touch panel 200 may perform a limited scan by activating a portion of the plurality of driving lines TX1, TX2, TX3, TX4, TX5, TX6, TX7 and TX8. For example, as illustrated in FIG. 2A, the touch panel 200 may activate only odd-numbered driving lines TX1, TX3, TX5 and TX7 (shaded lines in FIG. 2A). For example, as illustrated in FIG. 3A, the touch panel 200 may operate in synchronization with the vertical synchronization signal VSYNC. The touch panel 200 may sequentially select the plurality of driving lines TX1, TX2, TX3, TX4, TX5, TX6, TX7 and TX8 in response to each pulse of a channel select signal CSS, and may apply a driving pulse TXP to the selected driving line each time one of the odd-numbered driving lines TX1, TX3, TX5 and TX7 is selected. When the driving pulse TXP is applied to each odd-numbered driving line TX1, TX3, TX5 and TX7, the touch panel 200 may activate odd-numbered sensing lines RX1, RX3, RX5, RX7 and RX9. For example, each time the driving pulse TXP is applied to one of the odd-numbered driving lines TX1, TX3, TX5 and TX7, the touch panel 200 may sequentially or simultaneously receive outputs from the odd-numbered sensing lines RX1, RX3, RX5, RX7 and RX9, and may measure capacitances at intersections (or touch points) between the one of the odd-numbered driving lines TX1, TX3, TX5 and TX7 and the odd-numbered sensing lines RX1, RX3, RX5, RX7 and RX9.

Accordingly, a touch "A", i.e., a coarse touch position, of a user may be sensed at the touch points located at the intersections between the odd-numbered driving lines TX1, TX3, TX5 and TX7 and the odd-numbered sensing lines RX1, RX3, RX5, RX7 and RX9. Although FIG. 2A illustrates an example where the limited scan is performed by activating the odd-numbered driving lines TX1, TX3, TX5 and TX7 and the odd-numbered sensing lines RX1, RX3, RX5, RX7 and RX9, according to example embodiments, the limited scan may be performed by activating any one or more driving lines of the plurality of driving lines TX1, TX2, TX3, TX4, TX5, TX6, TX7 and TX8 and any one or more sensing lines of the plurality of sensing lines RX1, RX2, RX3, RX4, RX5, RX6, RX7, RX8, RX9 and RX10.

Referring to FIG. 2B, once the coarse touch position of "A" is detected by the limited scan, e.g., (X3, Y7), the touch panel 200 may perform a local scan by activating driving lines TX2, TX3 and TX4 and sensing lines RX6, RX7 and RX8 near the coarse position (X3, Y7) of the touch A among the plurality of driving lines TX1, TX2, TX3, TX4, TX5, TX6, TX7 and TX8, and the plurality of sensing lines RX1, RX2, RX3, RX4, RX5, RX6, RX7, RX8, RX9 and RX10. For example, as illustrated in FIGS. 2B and 3B, in a case where the touch A is sensed at a coarse horizontal position "X3" and a coarse vertical position "Y7", the touch panel 200 may apply the driving pulse TXP to a driving line TX3 corresponding to the coarse horizontal position "X3" and at least one driving line TX2 and TX4 on each side of and adjacent to the driving line TX3. Further, the touch panel 200 may receive outputs from a sensing line RX7 corresponding to the coarse vertical position "Y7" and at least one sensing line RX6 and RX8 adjacent to the sensing line RX7, and thus may measure capacitance at intersections between the driving lines TX2, TX3 and TX4 and the sensing lines RX6, RX7, and RX8 near the coarse position "(X3, Y7)" of the touch A. Accordingly, a fine position of the touch A may be detected. According to example embodiments, the number of the driving lines TX2, TX3 and TX4 and the number of the sensing lines RX6, RX7 and RX8 activated during the local scan may vary depending on a size, a resolution, etc. of the touch panel 200.

As described above, in a method of operating the touch panel 200 according to example embodiments, the touch panel 200 may detect a coarse position of a touch with low resolution by performing a limited scan, i.e., a smaller number than a total number of driving/sensing lines may be used, and may detect a fine position of the touch with high resolution by performing a local scan, i.e., only driving/sensing lines adjacent to the coarse position may be used, thereby reducing scan time and power consumption of the touch panel 200.

Figure 4A:
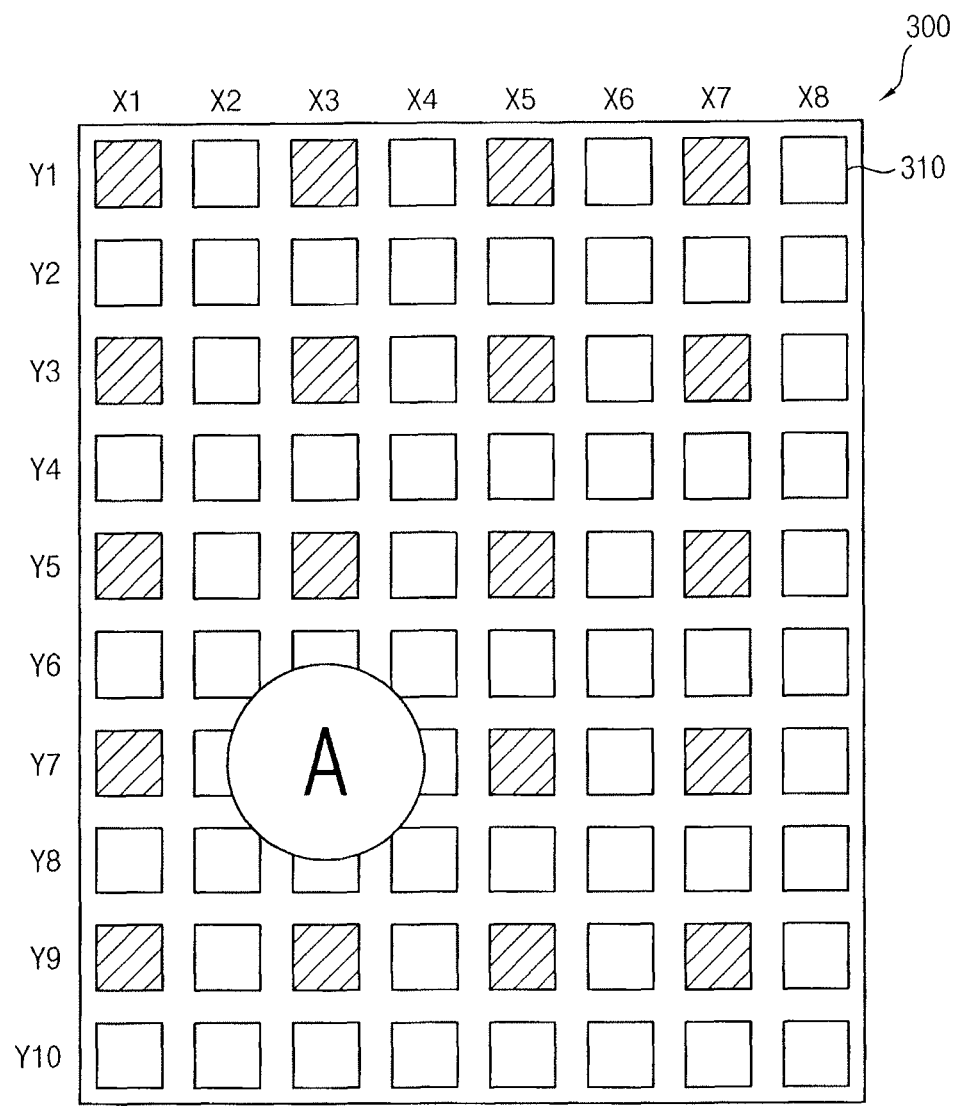
FIGS. 4A and 4B illustrate diagrams of an example of an operation of a touch panel in accordance with example embodiments.
Figure 4B:
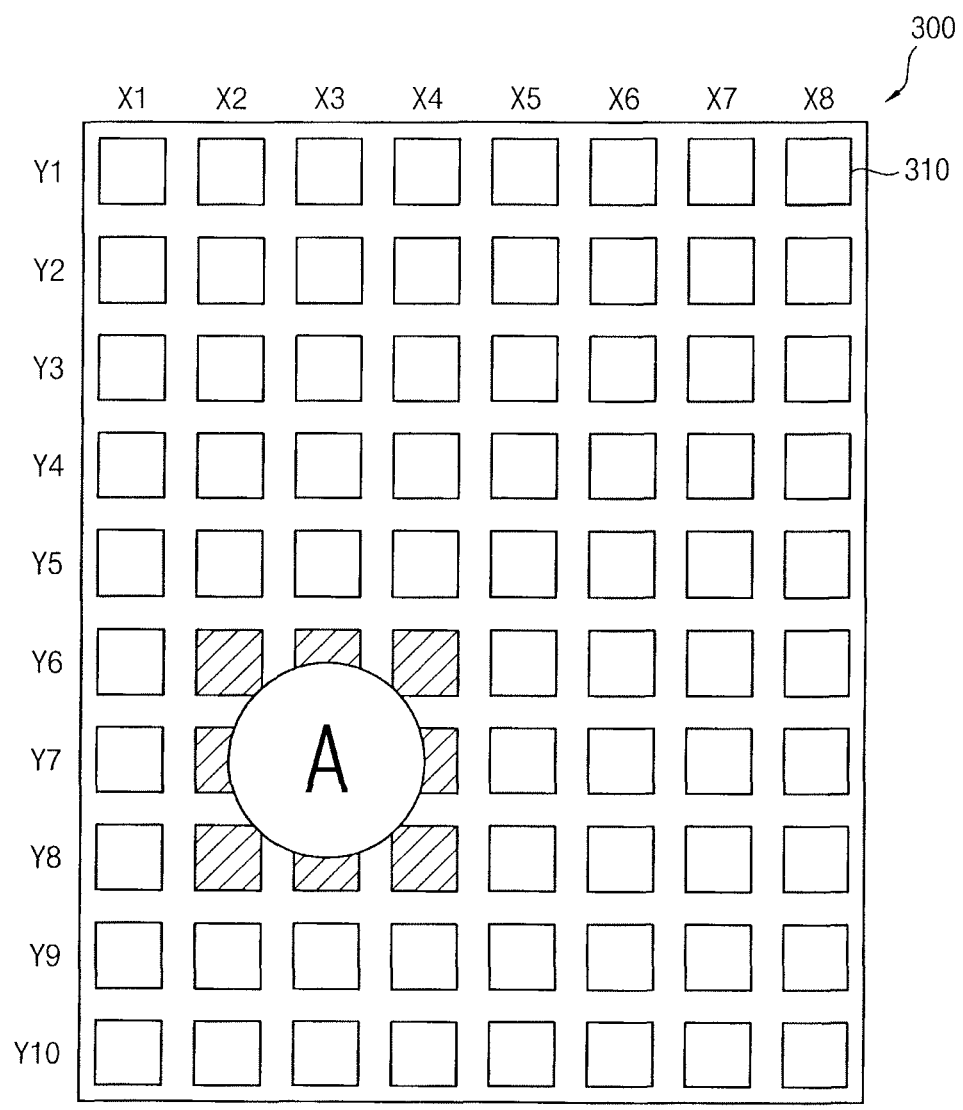

FIGS. 4A and 4B are diagrams illustrating an example of an operation of a touch panel in accordance with other example embodiments.

Referring to FIG. 4A, a touch panel 300 may include a plurality of touch sensor cells 310 arranged in a matrix form having a plurality of rows and a plurality of columns. Each touch sensor cell 310 may correspond to one touch point. Thus, the touch panel 300 may have a plurality of touch points arranged in a matrix form having a plurality of rows and a plurality of columns. According to example embodiments, the plurality of touch sensor cells 310 may be, e.g., resistive touch sensors, capacitive touch sensors, electromagnetic touch sensors, infrared touch sensors, surface acoustic wave (SAW) touch sensors, near field imaging (NFI) touch sensors, etc. For example, to sense a touch "A" by a user, each touch sensor cell 310 may emit light, and may detect the touch "A" by receiving light reflected from a finger of the user.

If a sensing operation of the touch panel 300 is initiated, the touch panel 300 may perform a limited scan that detects a coarse position of the touch A by the user by activating a portion of the plurality of touch sensor cells 310. For example, as illustrated in FIG. 4A, to perform the limited scan, the touch panel 300 may sequentially or simultaneously activate a portion of the plurality of touch sensor cells 310 located at intersections (e.g., only (X1, Y1), (X1, Y3), (X1, Y5), (X1, Y7), (X1, Y9), (X3, Y1), (X3, Y3), (X3, Y5), (X3, Y7), (X3, Y9), (X5, Y1), (X5, Y3), (X5, Y5), (X5, Y7), (X5, Y9), (X7, Y1), (X7, Y3), (X7, Y5), (X7, Y7) and (X7, Y9)) between a portion of the plurality of rows and a portion of the plurality of columns (shaded cells 310 I FIG. 4A). Accordingly, the touch A of the user may be sensed at the intersections between the portion of the rows and the portion of the columns.

Referring to FIG. 4B, once the coarse position (e.g., (X3, Y7)) of the touch A is detected, the touch panel 300 may perform a local scan by activating touch sensor cells near the coarse position of the touch A. For example, to perform the local scan, the touch panel 300 may activate only the touch sensor cell of the coarse position (e.g., (X3, Y7)) of the touch A and touch sensor cells (e.g., only touch sensor cells located at (X2, Y6), (X3, Y6), (X4, Y6), (X2, Y7), (X3, Y7), (X4, Y7), (X2, Y8), (X3, Y8) and (X4, Y8)) adjacent to the touch sensor cell. According to example embodiments, the number of the touch sensor cells activated during the local scan may vary depending on a size, a resolution, etc. of the touch panel 300.

As described above, in a method of operating the touch panel 300 according to example embodiments, the touch panel 300 may detect a coarse position of a touch by performing a limited scan, and may detect a fine position of the touch by performing a local scan. Therefore, scan time and power consumption of the touch panel 300 maybe reduced.

Although FIGS. 4A and 4B illustrate an example of the touch panel 300 performing the local scan once the coarse position of the touch is detected by the limited scan, in some example embodiments, the touch panel 300 may perform a limited scan and a local scan after an initial limited scan. In this case, the touch panel 300 may readily sense multiple touches by a user.

Figure 5A:
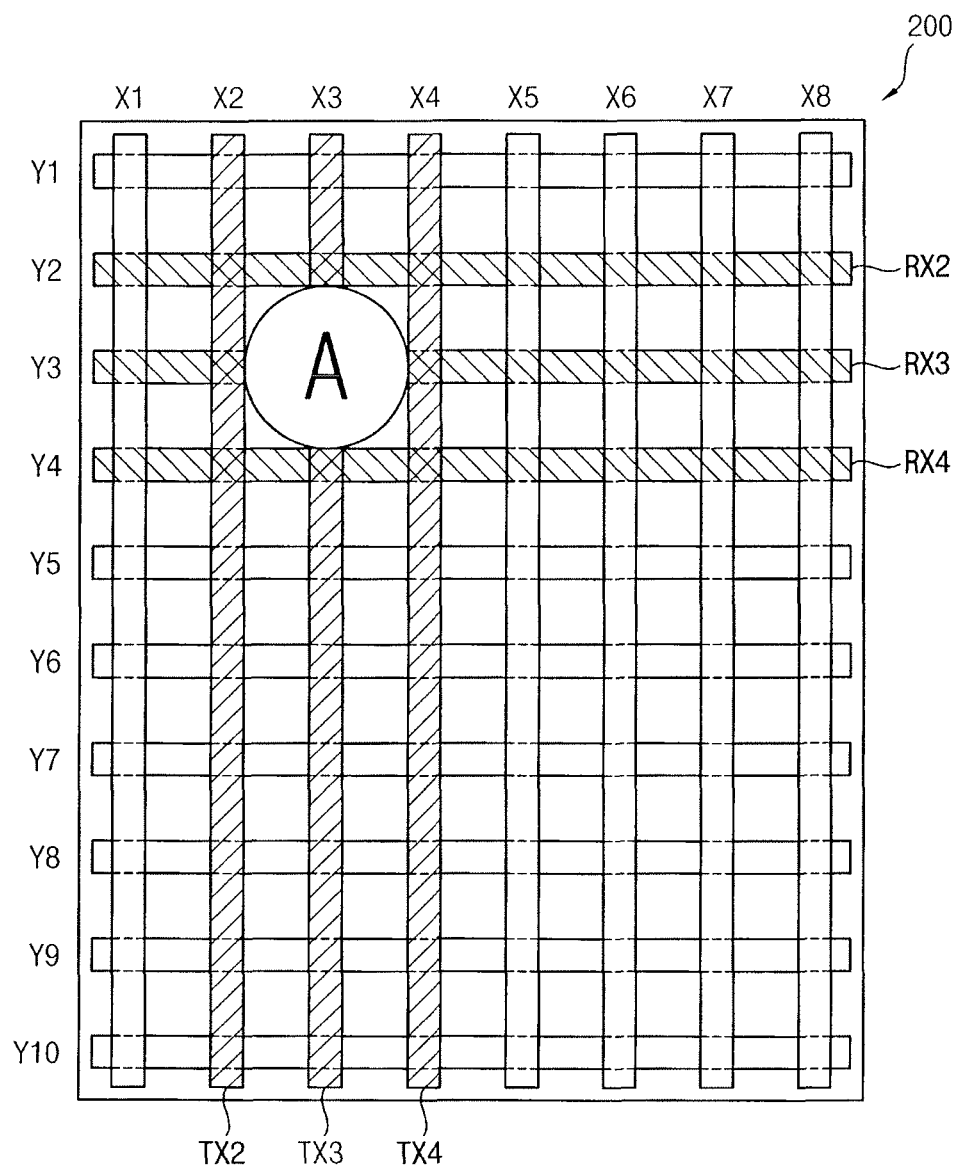
FIGS. 5A, 5B, and 5C illustrate diagrams of an example of an operation of a touch panel detecting a drag operation by a user in accordance with example embodiments.
Figure 5B:
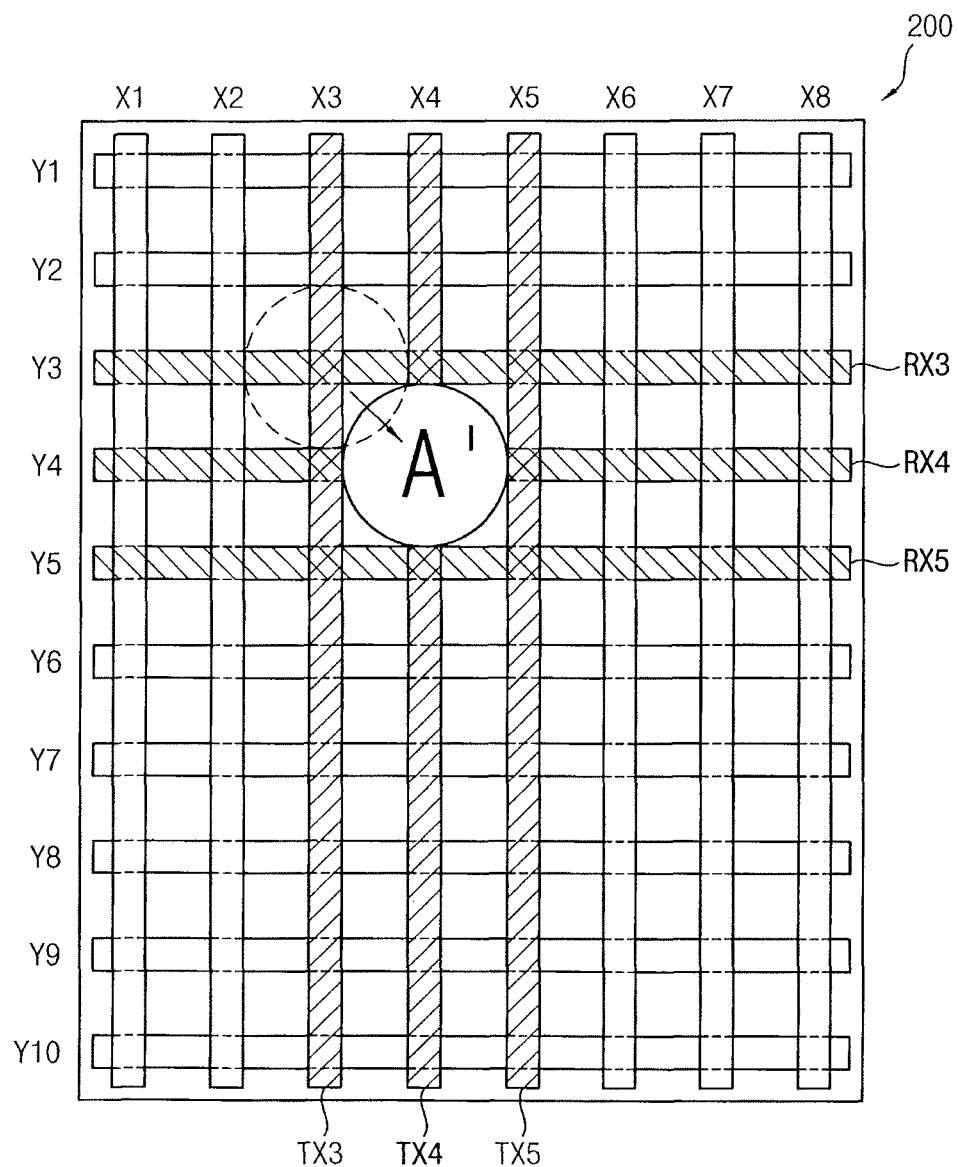
Figure 5C:
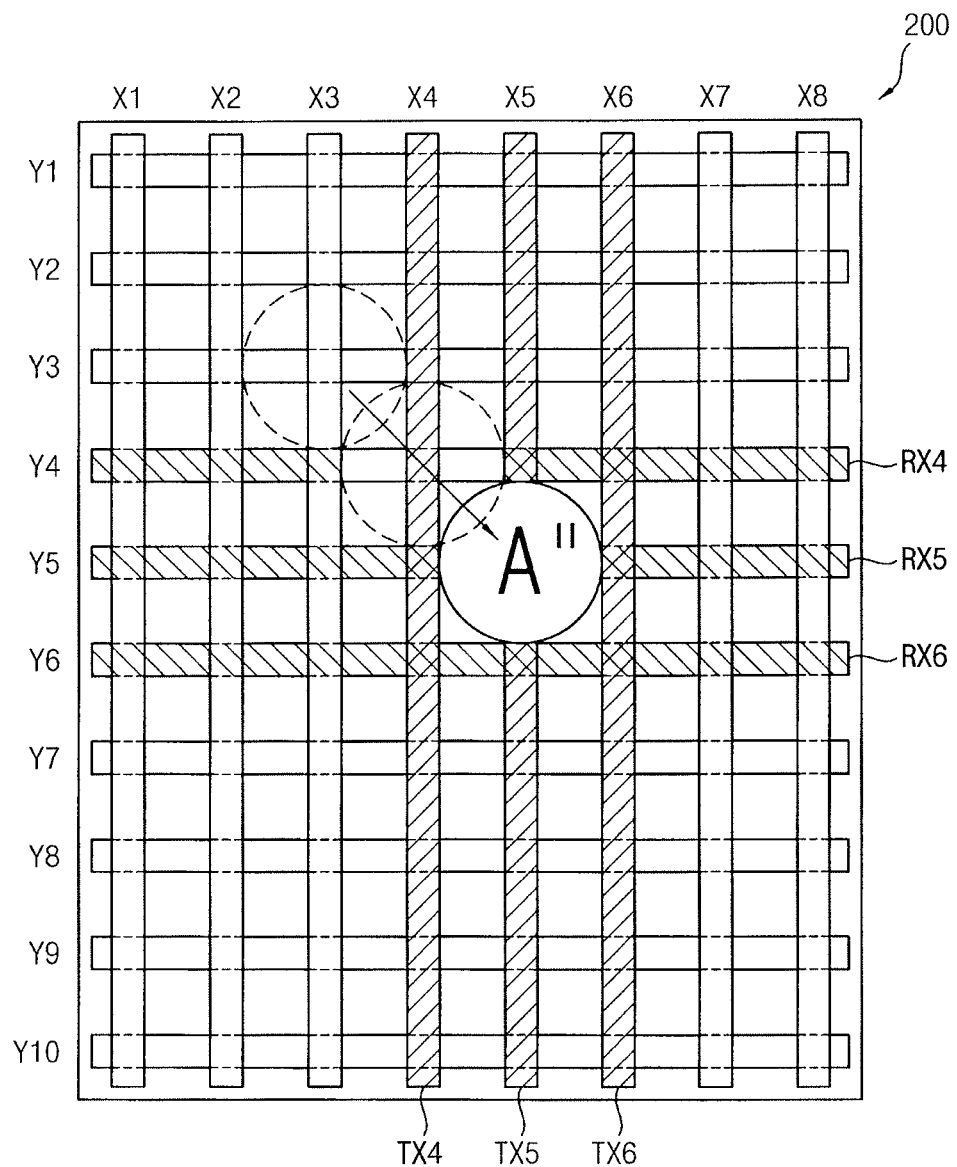

FIGS. 5A, 5B, and 5C are diagrams illustrating an example of an operation of a touch panel detecting a drag operation by a user in accordance with example embodiments.

Referring to FIG. 5A, as described previously with reference to FIGS. 2A-2B, the touch panel 200 may detect a fine position (e.g., (X3, Y3)) of the touch "A" by a user by sequentially performing a limited scan and a first local scan. For example, the touch panel 200 may perform the first local scan by activating driving lines (e.g., TX2, TX3 and TX4) and sensing lines (e.g., RX2, RX3 and RX4) near a coarse position of the touch "A" detected by the limited scan, and thus may detect the fine position (e.g., (X3, Y3)) of the touch A.

Referring to FIG. 5B, if the user performs a drag operation, the position of the touch "A" may be changed, e.g., from a coordinate "(X3, Y3)" to a coordinate "(X4, Y4)". Therefore, the touch panel 200 may detect a new fine position (e.g., (X4, Y4)) of the touch A' having a changed position by performing a second local scan. For example, if the position of the touch "A" is changed from the coordinate "(X3, Y3)" to the coordinate "(X4, Y4)", occurrence of the touch A' having the changed coordinate "(X4, Y4)" may be approximately detected by the first local scan. The touch panel 200 may then perform the second local scan by activating driving lines (e.g., TX3, TX4 and TX5) and sensing lines (e.g., RX3, RX4 and RX5) near the approximately detected changed position of the touch A'. Accordingly, the new fine position (e.g., (X4, Y4)) of the touch A' may be detected by the second local scan. Further, the position of the touch A' having the changed coordinate "(X4, Y4)" may be further changed, for example, from the coordinate "(X4, Y4)" to a coordinate "(X5, Y5)" by the drag operation by the user.

Referring to FIG. 5C, the touch panel 200 may detect a fine position (e.g., (X5, Y5)) of the touch A" having a changed position by performing a third local scan. For example, if the position of the touch A' is changed from the coordinate "(X4, Y4)" to the coordinate "(X5, Y5)", the touch A" having the changed coordinate "(X5, Y5)" may be detected by the second local scan, and the touch panel 200 may perform the third local scan by activating driving lines (e.g., TX4, TX5 and TX6) and sensing lines (e.g., RX4, RX5 and RX6) near a changed position of the touch A" detected by the second local scan. Accordingly, a fine position (e.g., (X5, Y5)) of the touch A" having the changed coordinate "(X5, Y5)" may be detected by the third local scan.

As described above, in a method of operating the touch panel 200 according to example embodiments, the touch panel 200 may repeatedly perform subsequent local scans that detect changed fine positions of the touch by activating driving lines and sensing lines near a previous fine position of a touch detected by a local scan. Accordingly, the drag operation of the user may be sensed by an initial local scan and subsequent local scans.

Figure 6A:
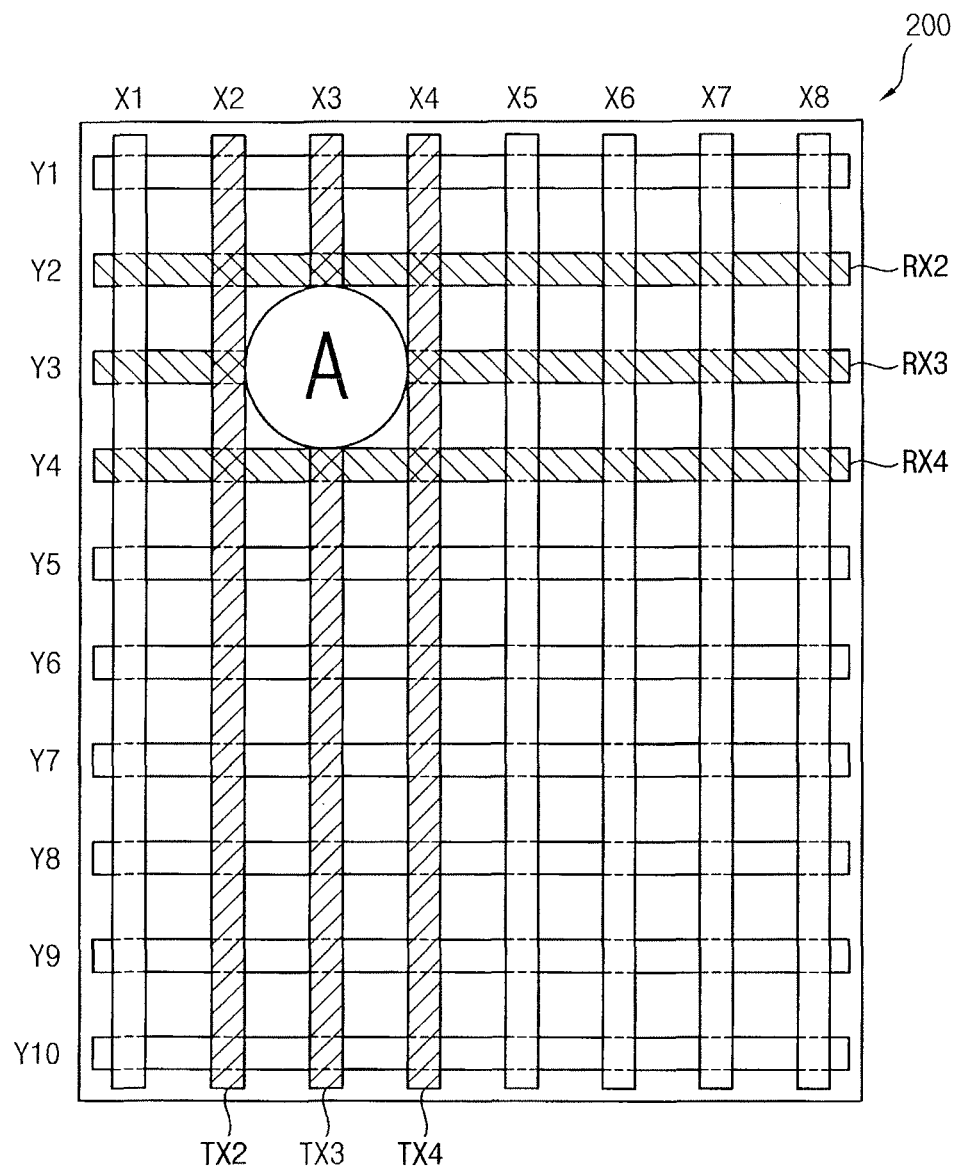
FIGS. 6A, 6B, and 6C illustrate diagrams of an example of an operation of a touch panel detecting separate touches in accordance with example embodiments.
Figure 6B:
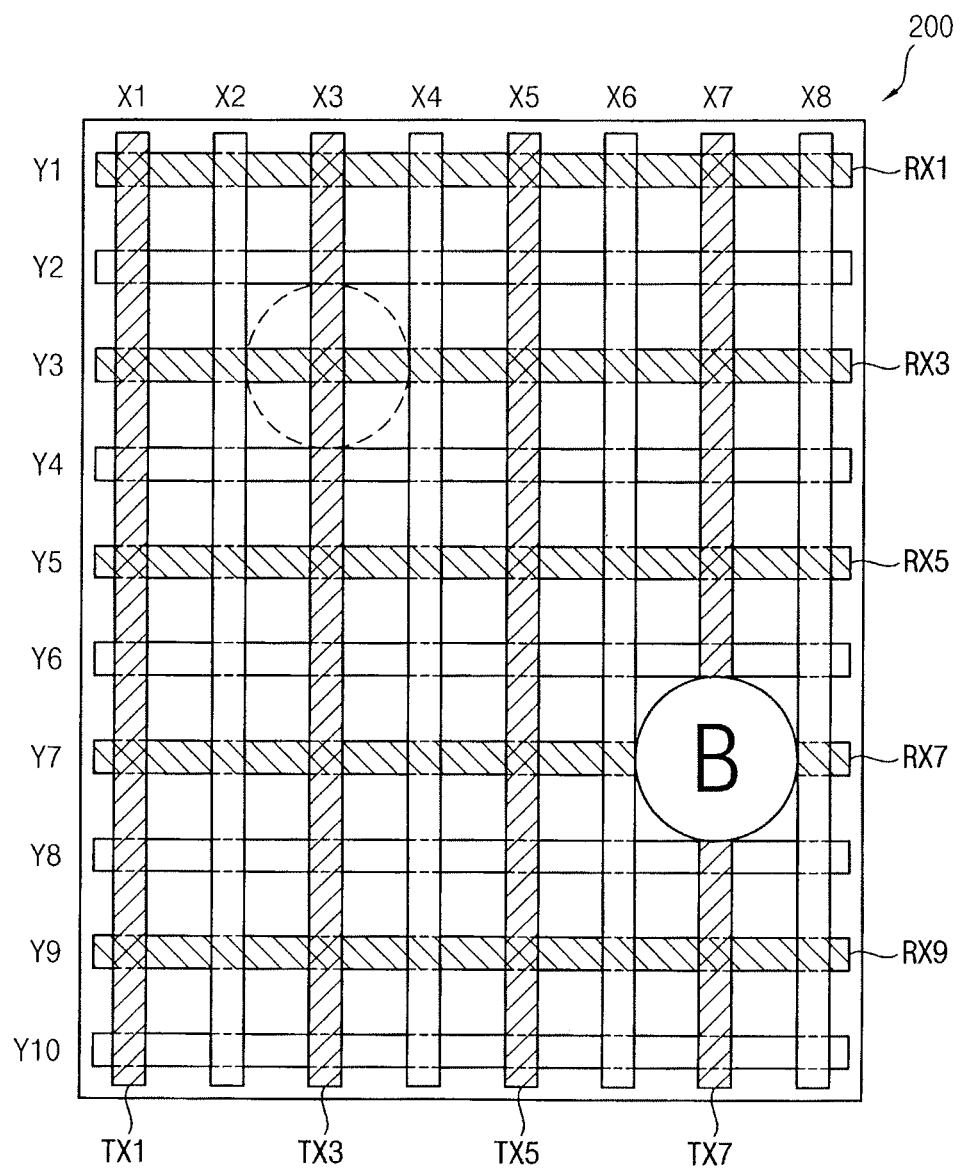
Figure 6C:
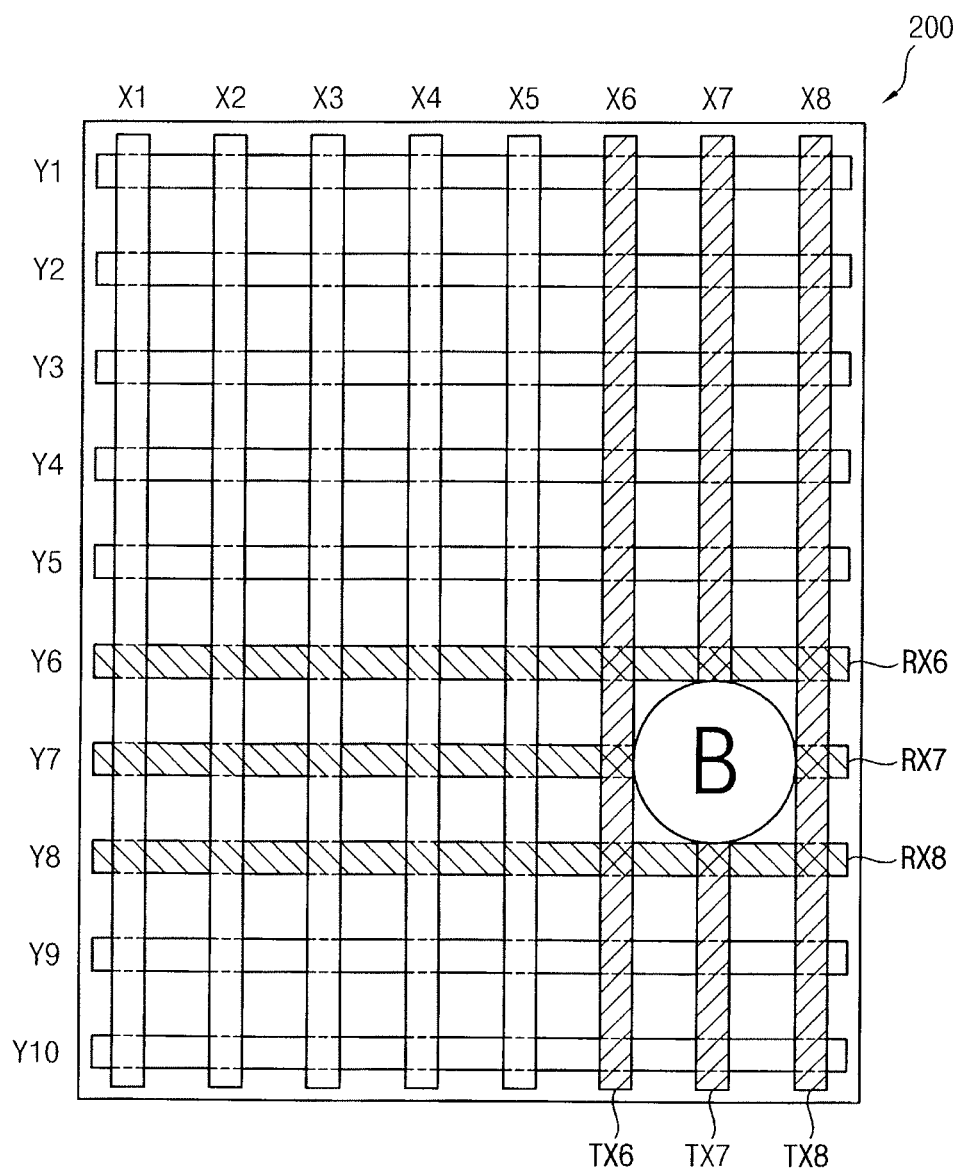

FIGS. 6A, 6B, and 6C are diagrams illustrating an example of an operation of a touch panel detecting separate touches in accordance with example embodiments.

Referring to FIG. 6A, the touch panel 200 may detect the fine position (e.g., (X3, Y3)) of the first touch A by a user by sequentially performing a first limited scan and a first local scan, as described previously with reference to FIGS. 2A-2B. For example, the touch panel 200 may perform the first local scan by activating driving lines (e.g., TX2, TX3 and TX4) and sensing lines (e.g., RX2, RX3 and RX4) near a coarse position of the first touch A detected by the first limited scan, and thus may detect the fine position (e.g., (X3, Y3)) of the first touch A. In a case where a second touch B spaced apart from the first touch A occurs after the first touch A disappears, no touch may be sensed by the first local scan, and the touch panel 200 may perform a second limited scan.

Referring to FIG. 6B, the touch panel 200 may detect a coarse position (e.g., (X7, Y7)) of the second touch B by the user by performing the second limited scan. For example, once the first touch A disappears, no touch may be sensed by the first local scan, and the touch panel 200 may perform the second limited scan by activating odd-numbered driving lines TX1, TX3, TX5 and TX7 and odd-numbered sensing lines RX1, RX3, RX5, RX7 and RX9. If the second touch B spaced apart from the first touch A occurs, the coarse position of the second touch B may be detected by the second limited scan. Once the coarse position of the second touch B is detected, the touch panel 200 may perform a second local scan by activating driving lines and sensing lines near the coarse position of the second touch B.

Referring to FIG. 6C, the touch panel 200 may detect a fine position (e.g., (X7, Y7)) of the second touch B by the user by performing the second local scan. For example, the touch panel 200 may perform the second local scan by activating driving lines (e.g., TX6, TX7 and TX8) and sensing lines (e.g., RX6, RX7 and RX8) near the coarse position of the second touch B detected by the second limited scan, and thus may detect the fine position (e.g., (X7, Y7)) of the second touch B.

As described above, in a method of operating the touch panel 200 according to example embodiments, the first touch A may be sensed by the first limited scan and the first local scan, and the second touch B spaced apart from the first touch A may be sensed by the subsequent second limited scan and the subsequent second local scan. Accordingly, a plurality of successive single touches by the user may be sensed by repeatedly performing the limited scans and the local scans.

FIG. 7 is a flow chart illustrating a method of operating a touch panel in accordance with other example embodiments.

Referring to FIG. 7, a touch panel may perform a limited scan that detects a coarse position of a first touch by a user by activating a portion of a plurality of driving lines and a portion of a plurality of sensing lines (S410). The portion of the plurality of driving lines activated during the limited scan may be any one or more driving lines, and the portion of the plurality of sensing lines activated during the limited scan may be any one or more sensing lines. For example, during the limited scan, the touch panel may activate only odd-numbered (or only even-numbered) driving lines and only odd-numbered (or only even-numbered) sensing lines.

If it is determined by the limited scan that no touch occurs (S420: NO), the limited scan may be performed again (S410). If the first touch is sensed by the limited scan (S420: YES), the touch panel may detect the coarse position of the first touch (S430).

Once the coarse position of the first touch is detected, the touch panel may perform an additional limited scan and a local scan that detect a coarse position of a new second touch and a fine position of the first touch by activating the portion of the plurality of driving lines and the portion of the plurality of sensing lines and by activating driving lines and sensing lines near the coarse position of the first touch (S440). For example, to perform the limited and local scan, the touch panel 200 may activate not only a first driving line corresponding to the coarse position of the first touch and at least one second driving line adjacent to the first driving line but also the odd-numbered (or even-numbered) driving lines, and may activate not only a first sensing line corresponding to the coarse position of the first touch and at least one second sensing line adjacent to the first sensing line but also the odd-numbered (or even-numbered) sensing lines. For example, in a case where the coarse position of the first touch is "(Xa, Ya)", the touch panel may activate the odd-numbered driving lines (i.e., driving lines corresponding to horizontal positions X1, X3, . . . ) as well as (Xa−A)-th through (Xa+A)-th driving lines, and may activate the odd-numbered sensing lines (i.e., sensing lines corresponding to vertical positions Y1, Y3, . . . ) as well as (Ya−B)-th through (Ya+B)-th sensing lines, where A is an integer greater than 0, and B is an integer greater than 0.

If the first touch and/or the second touch are sensed by the limited and local scan (S450: YES), the touch panel may detect the fine position of the first touch and/or the coarse position of the second touch (S460). That is, once the first touch is sensed by the limited scan, the touch panel may perform not only a local scan for the first touch but also the limited scan. Accordingly, the coarse position of the second touch, as well as the fine position of the first touch, may be simultaneously detected.

If the first touch and/or the second touch are sensed by the limited and local scan (S450: YES), and a sensing operation of the touch panel is not stopped (S470: NO), the touch panel may perform a subsequent limited and local scan (S440). During the subsequent limited and local scan, the touch panel may detect a coarse position of a new third touch, as well as fine positions of the first and second touches, by activating the portion of the plurality of driving lines and the portion of the plurality of sensing lines, by activating driving lines and sensing lines near the fine position of the first touch, and by activating driving lines and sensing lines near the coarse position of the second touch. For example, in a case where the fine position of the first touch is "(Xa', Ya')" and the coarse position of the second touch is "(Xb, Yb)", the touch panel may activate the odd-numbered driving lines, (Xa'−A)-th through (Xa'+A)-th driving lines and (Xb−A)-th through (Xb+A)-th driving lines, and may activate the odd-numbered sensing lines, (Ya'−B)-th through (Ya'+B)-th sensing lines and (Yb−B)-th through (Yb+B)-th sensing lines. Accordingly, the touch panel may sense multiple touches by the user, i.e., a multi-touch, by performing not only the local scan for a region where each touch has been occurred but also the limited scan.

If no touch is sensed by the limited and local scan (S450: NO), the touch panel may perform the limited scan again (S410). While the touch panel performs the sensing operation, the touch panel may receive a request (for example, from a host) to stop the sensing operation (S470: YES), and may stop the sensing operation in response to the request.

As described above, in the method of operating the touch panel according to example embodiments, the touch panel may detect a first coarse position of a first touch with low resolution by performing the limited scan. If the first coarse position of the touch is detected by the limited scan, the touch panel may perform limited and local scans in a region near the detected first coarse position, thereby detecting a second coarse position of a new touch and a fine position of the first touch simultaneously. Accordingly, scan time and power consumption of the touch panel may be reduced, and the multi-touch by the user may be readily sensed.

Figure 8A:
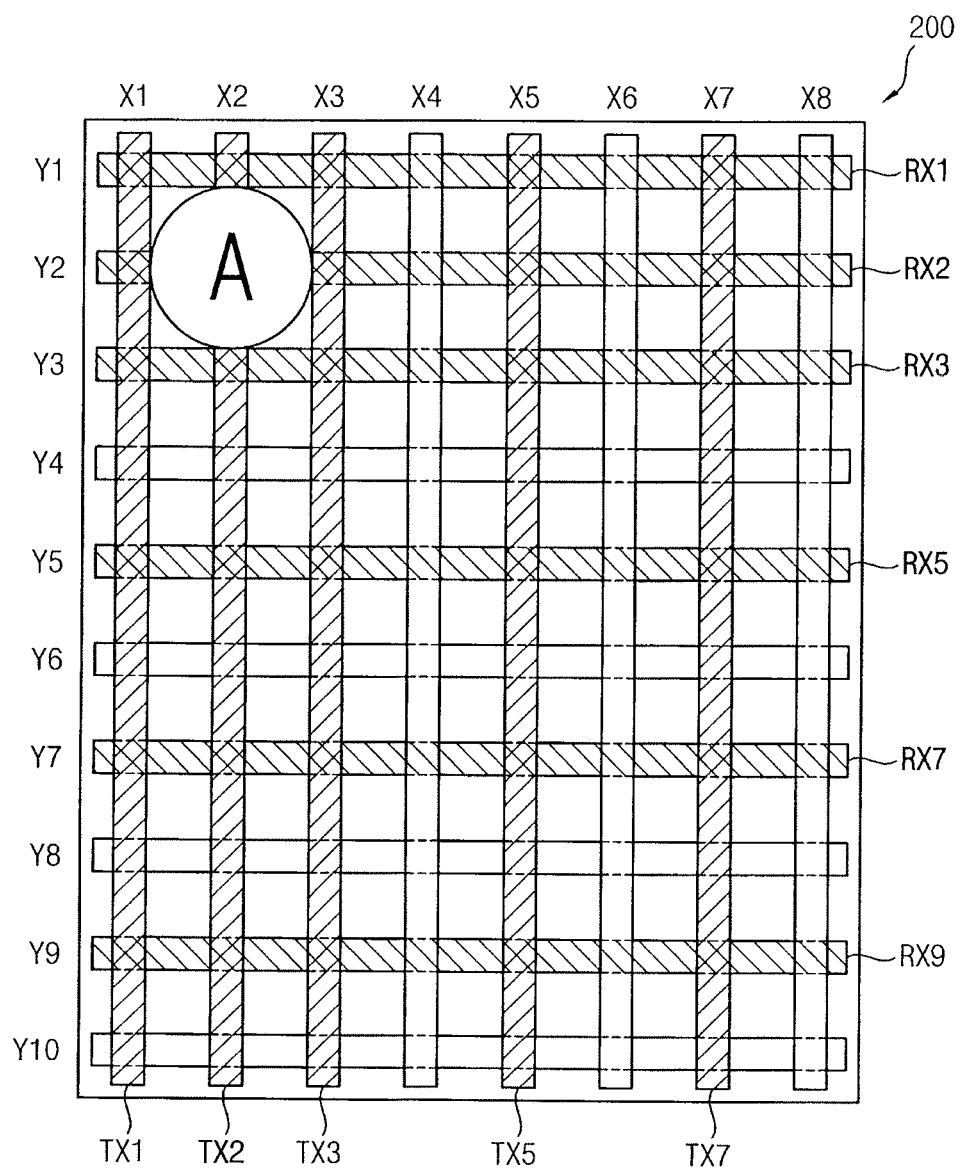
FIGS. 8A, 8B, and 8C illustrate diagrams of an example of an operation of a touch panel detecting multiple touches in accordance with example embodiments.
Figure 8B:
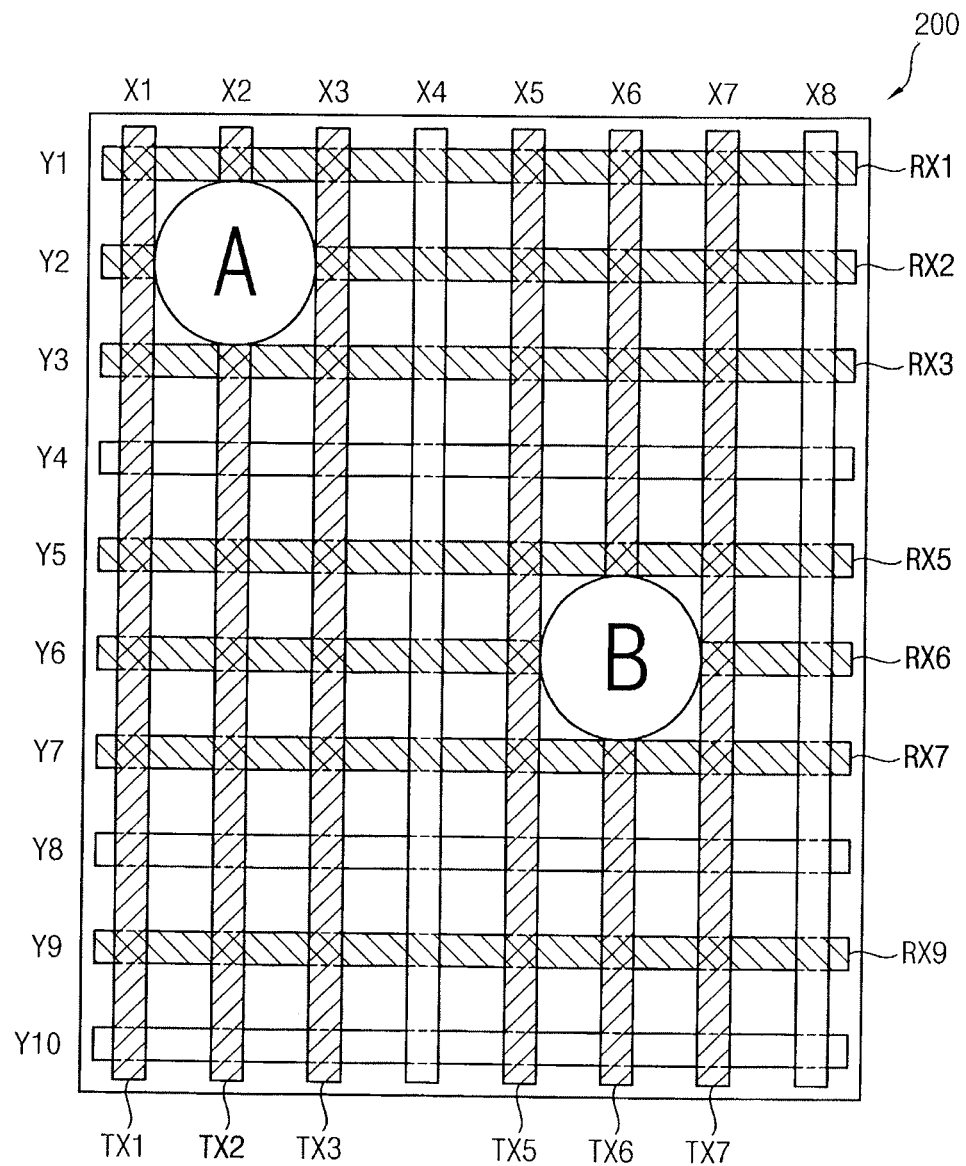
Figure 8C:
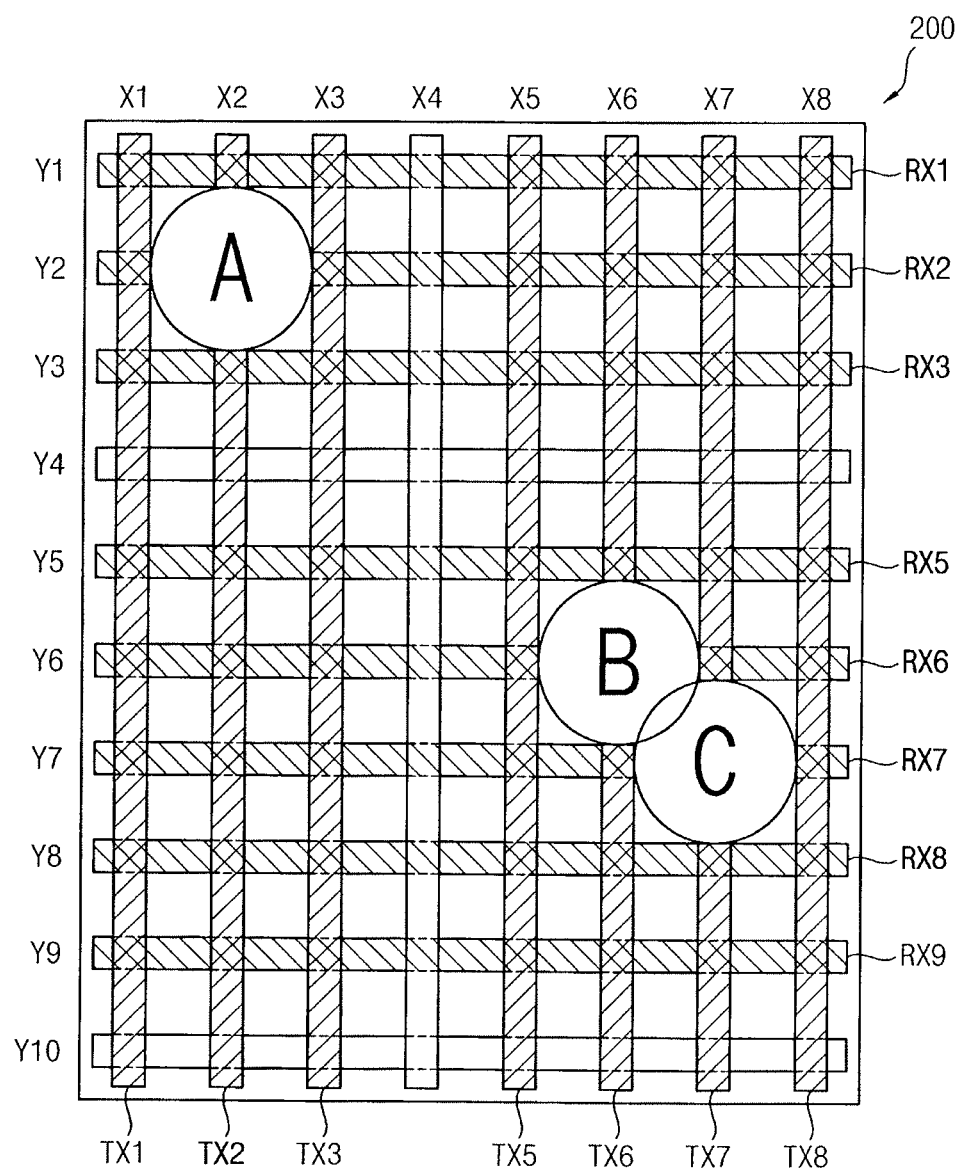

FIGS. 8A, 8B, and 8C are diagrams illustrating an example of an operation of a touch panel detecting multiple touches in accordance with example embodiments.

Referring to FIG. 8A, the touch panel 200 may detect a fine position (e.g., (X2, Y2)) of a first touch A and a coarse position of a second touch by sequentially performing a limited scan and a first limited and local scan. For example, the touch panel 200 may perform the limited scan to detect a coarse position of the first touch A. If the coarse position of the first touch A is detected by the limited scan, the touch panel 200 may perform the first limited and local scan to detect the fine position of the first touch A and a coarse position of a second touch. To perform the first limited and local scan, the touch panel 200 may activate odd-numbered driving lines TX1, TX3, TX5 and TX7 and driving lines TX1, TX2 and TX3 near the coarse position of the first touch A, and may activate odd-numbered sensing lines RX1, RX3, RX5 and RX7 and sensing lines RX1, RX2 and RX3 near the coarse position of the first touch A.

Referring to FIG. 8B, the touch panel 200 may detect the fine position of the first touch A, a fine position (e.g., (X6, Y6)) of the second touch B, and a coarse position of a third touch by performing a second limited and local scan. For example, to perform the second limited and local scan, the touch panel 200 may activate the odd-numbered driving lines TX1, TX3, TX5 and TX7, driving lines TX1, TX2 and TX3 near the fine position of the first touch A and driving lines TX5, TX6 and TX7 near the coarse position of the second touch B, and may activate the odd-numbered sensing lines RX1, RX3, RX5 and RX7, sensing lines RX1, RX2 and RX3 near the fine position of the first touch A and sensing lines RX5, RX6 and RX7 near the coarse position of the second touch B. Accordingly, the fine positions of the first and second touches A and B and the coarse position of the third touch may be detected.

Referring to FIG. 8C, the touch panel 200 may detect the fine position of the first touch A, the fine position of the second touch B, and a fine position (e.g., (X7, Y7)) of the third touch C by performing a third limited and local scan. For example, to perform the third limited and local scan, the touch panel 200 may activate the odd-numbered driving lines TX1, TX3, TX5 and TX7, the driving lines TX1, TX2 and TX3 near the fine position of the first touch A, driving lines TX5, TX6 and TX7 near the fine position of the second touch B, and driving lines TX6, TX7 and TX8 near the coarse position of the third touch C, and may activate the odd-numbered sensing lines RX1, RX3, RX5 and RX7, the sensing lines RX1, RX2 and RX3 near the fine position of the first touch A, sensing lines RX5, RX6 and RX7 near the fine position of the second touch B, and sensing lines RX6, RX7 and RX8 near the coarse position of the third touch C. Accordingly, the fine positions of the first, second, and third touches A, B, and C may be detected. If one or more driving lines near positions of touches and/or one or more sensing lines near the positions of the touches overlap with each other, as in the case of the second touch B and the third touch C, the overlapping driving lines and/or the overlapping sensing lines may be activated once per touch frame.

As described above, in a method of operating the touch panel 200 according to example embodiments, if a coarse position of a touch is detected by a limited scan, the touch panel 200 may detect not only a fine position of the touch but also a coarse position of a new touch by performing a limited and local scan including the limited scan as well as a local scan for a region near the coarse position of the touch. Accordingly, scan time and power consumption of the touch panel 200 may be reduced, and a multi-touch by a user may be readily sensed.

Figure 9:
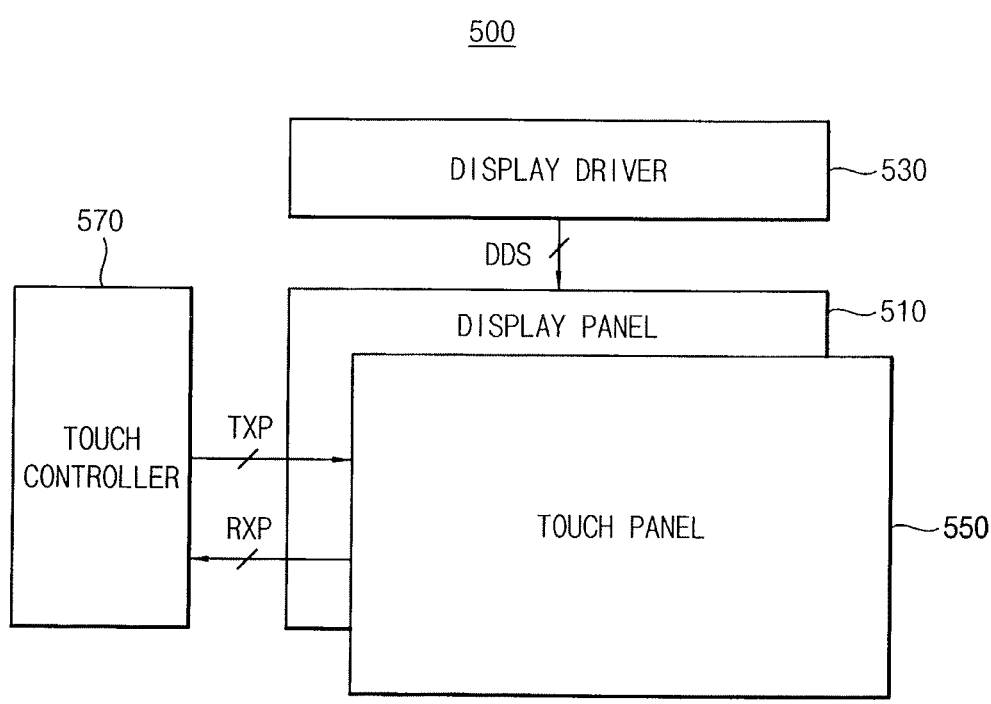
FIG. 9 illustrates a block diagram of a display device in accordance with example embodiments.

FIG. 9 is a block diagram illustrating a display device in accordance with example embodiments. Referring to FIG. 9, a display device 500 may include a display panel 510, a display driver 530, a touch panel 550, and a touch controller 570.

The display panel 510 may display an image. For example, the display panel 510 may be one of various display panels, e.g., a liquid crystal display (LCD) panel, a light emitting diode (LED) panel, an organic light emitting diode (OLED) panel, a field emission display (FED) panel, etc.

The display driver 530 may drive the display panel 510. The display driver 530 may apply a display data signal DDS to the display panel 510, and the display panel 510 may display the image corresponding to the display data signal DDS. For example, the display driver 530 may include a scan driver that selects each row of the display panel 510, a source driver that applies the display data signal DDS to pixels of the selected row, and a timing controller that controls timings of the scan driver and the source driver.

The touch panel 550 may include a plurality of driving lines extending in a first direction, and a plurality of sensing lines extending in a second direction substantially perpendicular to the first direction. According to example embodiments, the touch panel 550 may be, e.g., a resistive touch panel, a capacitive touch panel, an electromagnetic touch panel, an infrared touch panel, a surface acoustic wave (SAW) touch panel, a near field imaging (NFI) touch panel, or the like. Further, according to example embodiments, the touch panel 550 may be, e.g., an add-on type touch panel that is mounted on the display panel 510 or an embedded type touch panel that is formed within the display panel 510. For example, the touch panel 550 may be an on-cell type embedded touch panel of which touch sensor cells are formed on the pixels of the display panel 510, or may be an in-cell type embedded touch panel of which the touch sensor cells are formed within the pixels of the display panel 510.

The touch controller 570 may drive the touch panel 550. For example, the touch controller 570 may apply a touch pulse TXP to the plurality of driving lines of the touch panel 550, and may receive outputs RXP from the plurality of sensing lines of the touch panel 550. As illustrated in FIG. 9, the display driver 530 and the touch controller 570 may be implemented as separate chips.

In some example embodiments, the touch controller 570 may drive the touch panel 550 to perform a limited scan and a local scan. For example, the touch controller 570 may control the touch panel 550 to perform the limited scan that detects a coarse position of a touch by activating a portion, e.g., a subset, of the plurality of driving lines and a portion, e.g., a subset, of the plurality of sensing lines. Once the coarse position of the touch is detected by the limited scan, the touch controller 570 may control the touch panel 550 to perform the local scan that detects a fine position of the touch by activating driving lines and sensing lines near, e.g., adjacent, the coarse position of the touch. As described above, the touch panel 550 may perform the limited scan and the local scan, thereby reducing scan time and power consumption of the touch panel 550.

In other example embodiments, the touch controller 570 may drive the touch panel 550 to perform the limited scan and additional simultaneous limited and local scan. For example, the touch controller 570 may control the touch panel 550 to perform the limited scan that detects a coarse position of a first touch by activating the portion of the plurality of driving lines and the portion of the plurality of sensing lines. Once the coarse position of the first touch is detected by the limited scan, the touch controller 570 may control the touch panel 550 to perform the limited and local scan that detects a fine position of the first touch and a coarse position of a second touch by activating the portion of the plurality of driving lines and sensing lines near the coarse position of the first touch and by activating the portion of the plurality of driving lines and sensing lines near the coarse position of the first touch. As described above, the touch panel 550 may perform the limited scan and the additional simultaneous limited and local scan, thereby readily sensing a multi-touch by a user while reducing the scan time and the power consumption of the touch panel 550.

As described above, since the touch panel 550 performs the limited scan and the local scan (or the limited and local scan), the display device 500 according to example embodiments may reduce the scan time and the power consumption of the touch panel 550.

Figure 10:
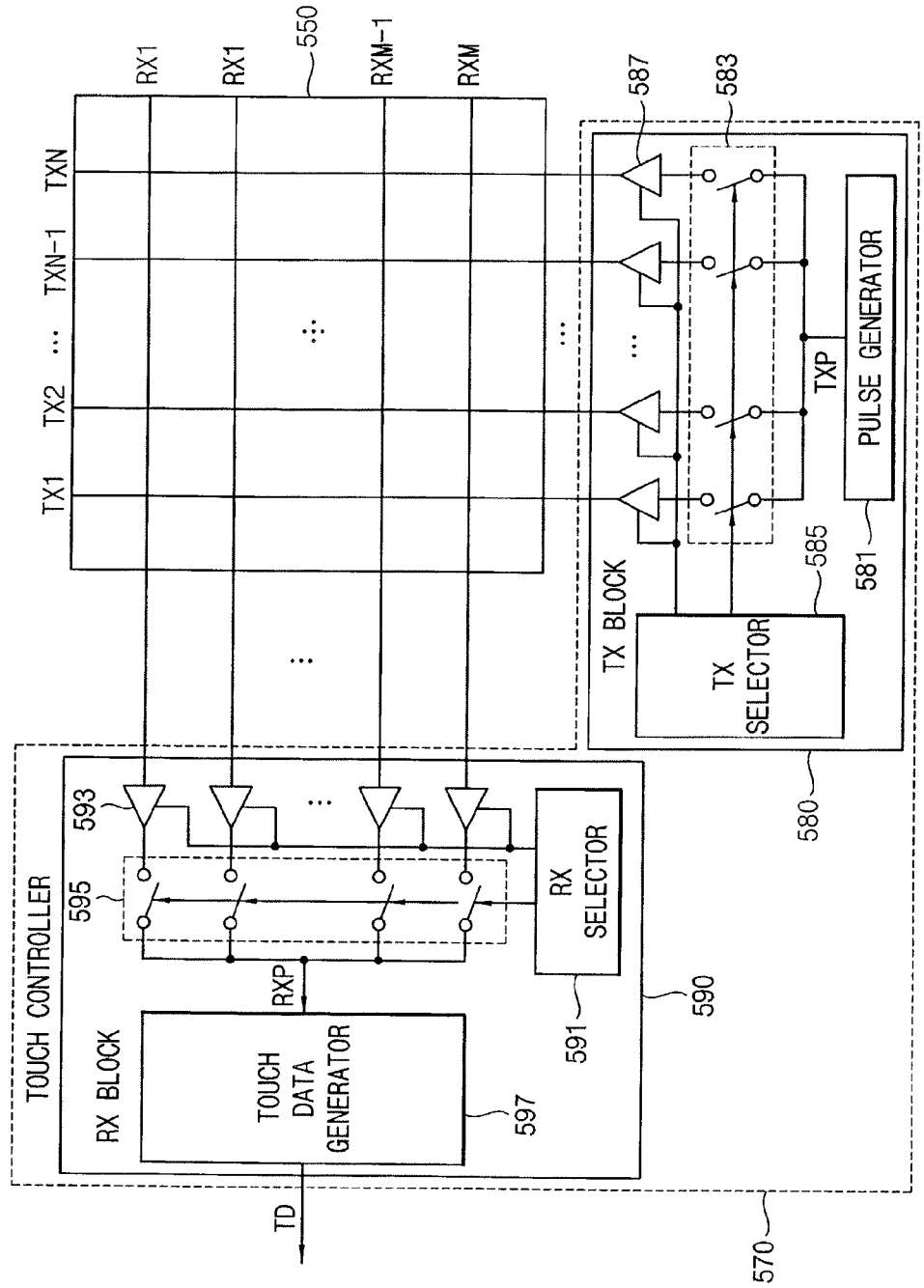
FIG. 10 illustrates a block diagram of a touch controller included in a display device of FIG. 9.

FIG. 10 is a block diagram illustrating a touch controller included in the display device 500 of FIG. 9. Referring to FIG. 10, the touch controller 570 may include a transmitting block 580 and a receiving block 590.

The transmitting block 580 may apply a driving pulse TXP to a plurality of driving lines TX1, TX2, TXN-1, and TXN. The transmitting block 580 may include a pulse generator 581, a first switching unit 583, and a driving line selector 585. The pulse generator 581 may generate the driving pulse TXP. The first switching unit 583 may be controlled by the driving line selector 585 to couple the pulse generator 581 to a selected driving line among the plurality of driving lines TX1, TX2, TXN-1, and TXN. For example, when a limited scan is performed, the driving line selector 585 may control the first switching unit 583 to sequentially couple the pulse generator 581 to odd-numbered driving lines TX1 and TXN-1, and thus the driving pulse TXP may be sequentially applied only to the odd-numbered driving lines TX1 and TXN-1. Further, when a local scan is performed, the driving line selector 585 may control the first switching unit 583 to sequentially couple the pulse generator 581 to driving lines near a coarse position of a sensed touch, and thus the driving pulse TXP may be sequentially applied only to the driving lines near the coarse position. According to example embodiments, the transmitting block 580 may further include transmitting buffers 587 amplifying the driving pulse TXP to a predetermined level. In some example embodiments, the driving line selector 585 may supply power only to at least one transmitting buffer 587 coupled to the selected driving line, thereby reducing power consumption.

The receiving block 590 may receive outputs RXP from a plurality of sensing lines RX1, RX2, RXM-1, and RXM. The receiving block 590 may include a second switching unit 595, a sensing line selector 591, and a touch data generator 597. The second switching unit 595 may be controlled by the sensing line selector 591 to simultaneously or sequentially couple at least one selected sensing line among the plurality of sensing lines RX1, RX2, RXM-1, and RXM to the touch data generator 597. For example, when the limited scan is performed, the sensing line selector 591 may control the second switching unit 595 to sequentially couple only odd-numbered sensing lines RX1 and RXM-1 to the touch data generator 597, and thus outputs RXP from the odd-numbered sensing lines RX1 and RXM-1 may be sequentially applied to the touch data generator 597. Further, when the local scan is performed, the sensing line selector 591 may control the second switching unit 595 to sequentially couple only sensing lines near the coarse position of the sensed touch to the touch data generator 597, and thus outputs RXP from the sensing lines near the coarse position may be sequentially applied to the touch data generator 597. The touch data generator 597 may generate touch data TD based on the outputs RXP from the plurality of sensing lines RX1, RX2, RXM-1 and RXM, and may provide the touch data TD to an external host, e.g., an application processor. According to example embodiments, the receiving block 590 may further include receiving buffers 593 amplifying the outputs RXP of the plurality of sensing lines RX1, RX2, RXM-1, and RXM to a predetermined level. In some example embodiments, the sensing line selector 591 may supply power only to at least one receiving buffer 593 coupled to the selected sensing line, thereby reducing power consumption.

Figure 11:
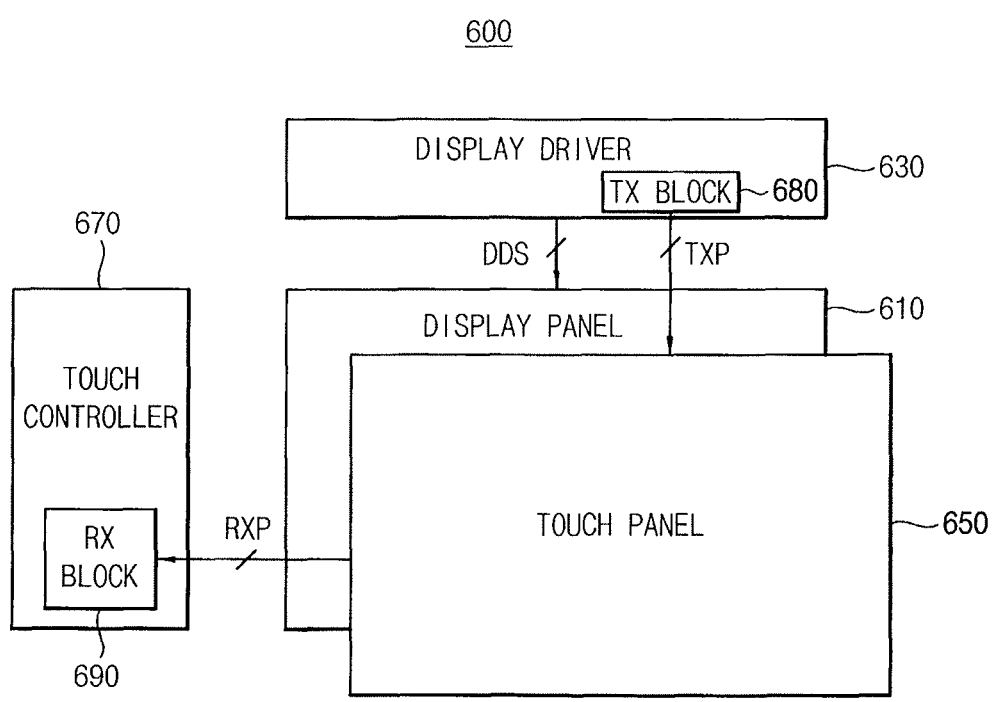
FIG. 11 illustrates a block diagram of a display device in accordance with example embodiments.

FIG. 11 is a block diagram illustrating a display device in accordance with other example embodiments.

Referring to FIG. 11, a display device 600 may include a display panel 610, a display driver 630, a touch panel 650, and a touch controller 670. The display device 600 of FIG. 11 may have a configuration substantially similar to that of the display device 500 of FIG. 9, except for a location of a transmitting block 680.

The transmitting block 680 applying a driving pulse TXP to a plurality of driving lines may be located at a chip where the display driver 630 is implemented, and a receiving block 690 receiving outputs RXP from a plurality of sensing lines may be located at a chip where the touch controller 670 is implemented.

Figure 12:
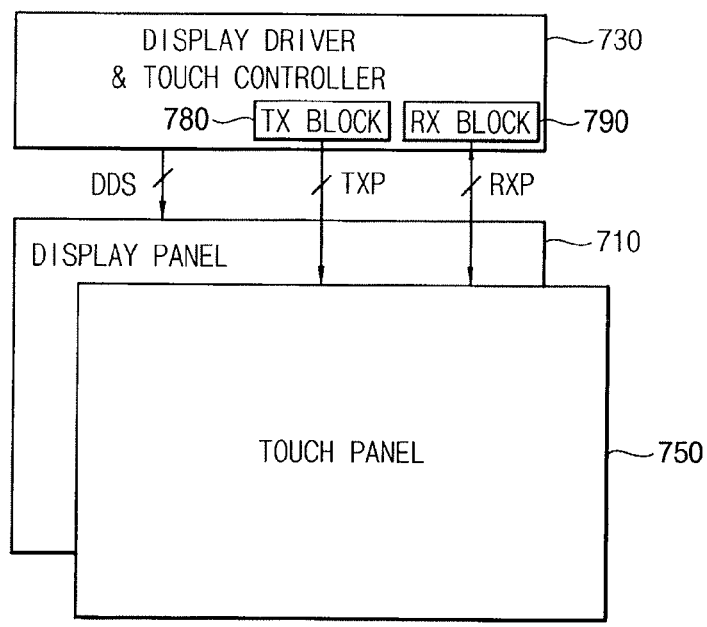
FIG. 12 illustrates a block diagram of a display device in accordance with example embodiments.

FIG. 12 is a block diagram illustrating a display device in accordance with other example embodiments.

Referring to FIG. 12, a display device 700 may include a display panel 710, a touch panel 750, and a display driver and touch controller 730. The display device 700 of FIG. 12 may have a configuration substantially similar to that of the display device 500 of FIG. 9, except that a display driver and a touch controller may be implemented as one chip 730.

The display driver driving the display panel 710 and the touch controller driving the touch panel 750 may be implemented as one chip 730. Thus, a transmitting block 780 applying a driving pulse TXP to a plurality of driving lines and a receiving block 790 receiving outputs RXP from a plurality of sensing lines may be located at the chip 730 where the display driver and the touch controller are implemented.

Figure 13:
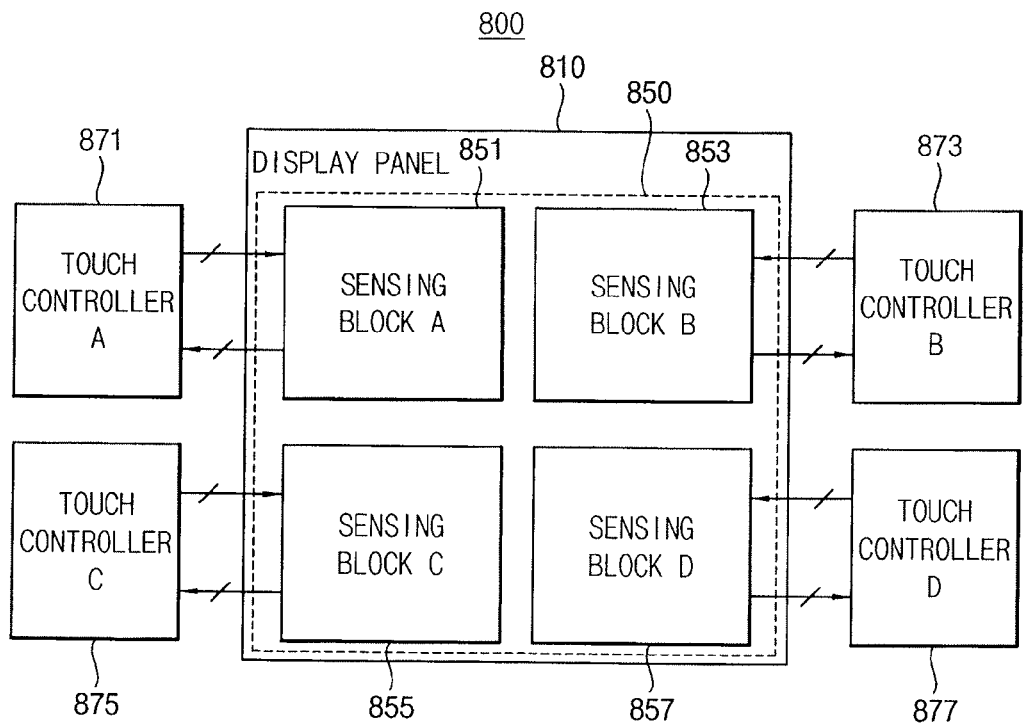
FIG. 13 illustrates a block diagram of a display device in accordance with example embodiments.

FIG. 13 is a block diagram illustrating a display device in accordance with other example embodiments.

Referring to FIG. 13, a display device 800 may include a display panel 810, a touch panel 850, and touch controllers 871, 873, 875, and 877. The display device 800 may further include a display driver driving the display panel 810.

The touch panel 850 may include a plurality of sensing blocks 851, 853, 855, and 857 that operate independently of each other. As a display device becomes larger, the number of driving lines and the number of sensing lines included in a touch panel may increase. If the number of driving lines and sensing lines increases, scan time of all the driving and sensing lines in the touch panel may increase, thereby not being able to complete a sensing operation of the touch panel within a desired time period. However, in the display device 800 according to example embodiments, the touch panel 850 may be divided into the plurality of sensing blocks 851, 853, 855, and 857 that operate independently of each other, and thus the touch panel 850 may have a reduced scan time.

In some example embodiments, the plurality of sensing blocks 851, 853, 855, and 857 may be respectively controlled by the touch controllers 871, 873, 875, and 877 to operate independently of each other. For example, a first sensing block 851 may be controlled by a first touch controller 871, a second sensing block 853 may be controlled by a second touch controller 873, a third sensing block 855 may be controlled by a third touch controller 875, and a fourth sensing block 857 may be controlled by a fourth touch controller 877. Since the plurality of sensing blocks 851, 853, 855, and 857 operate independently, e.g., and simultaneously, the scan time of the touch panel 850 may substantially be the same as a scan time of each of the sensing block 851, 853, 855, and 857. Although FIG. 13 illustrates an example where a plurality of touch controllers 871, 873, 875, and 877 controls the plurality of sensing blocks 851, 853, 855, and 857, respectively, in some example embodiments, a single touch controller may control the plurality of sensing blocks 851, 853, 855, and 857 to operate independently.

In some example embodiments, the touch controllers 871, 873, 875, and 877 may control the touch panel 850 such that, in each touch frame, a portion of the plurality of sensing blocks 851, 853, 855, and 857 may perform a limited scan that detects a coarse position of a touch by a user, and the remaining portion of the plurality of sensing blocks 851, 853, 855, and 857 may not perform a sensing operation. For example, the touch controllers 871, 873, 875, and 877 may sequentially activate the plurality of sensing blocks 851, 853, 855 and 857, such that one of the plurality of sensing blocks 851, 853, 855, and 857 performs the limited scan in each touch frame. That is, the first touch controller 871 may activate the first sensing block 851 in a first touch frame, the second touch controller 873 may activate the second sensing block 853 in a second touch frame, the third touch controller 875 may activate the third sensing block 855 in a third touch frame, and the fourth touch controller 877 may activate the fourth sensing block 857 in a fourth touch frame. If the coarse position of the touch is detected by the limited scan, the touch controllers 871, 873, 875, and 877 may control the touch panel 850 such that a sensing block having sensed the touch among the plurality of sensing blocks 851, 853, 855, and 857 may perform a local scan that detects a fine position of the touch. For example, in a case where the first sensing block 851 has sensed the touch by performing the limited scan in the first touch frame, the first touch controller 871 may control the first sensing block 851 to perform the local scan in the second touch frame.

In other example embodiments, if the coarse position of the touch is detected by the limited scan, the touch controllers 871, 873, 875, and 877 may control the touch panel 850 such that the sensing block having sensed the touch may perform the local scan and another sensing block may perform the limited scan. For example, in a case where the first sensing block 851 has sensed the touch by performing the limited scan in the first touch frame, in the second touch frame, the first touch controller 871 may control the first sensing block 851 to perform the local scan and the second touch controller 873 may control the second sensing block 853 to perform the limited scan.

As described above, a portion of the plurality of sensing blocks 851, 853, 855, and 857 may perform the limited scan and/or the local scan at a certain time, thereby reducing the scan time and power consumption of the touch panel 850.

Figure 14:
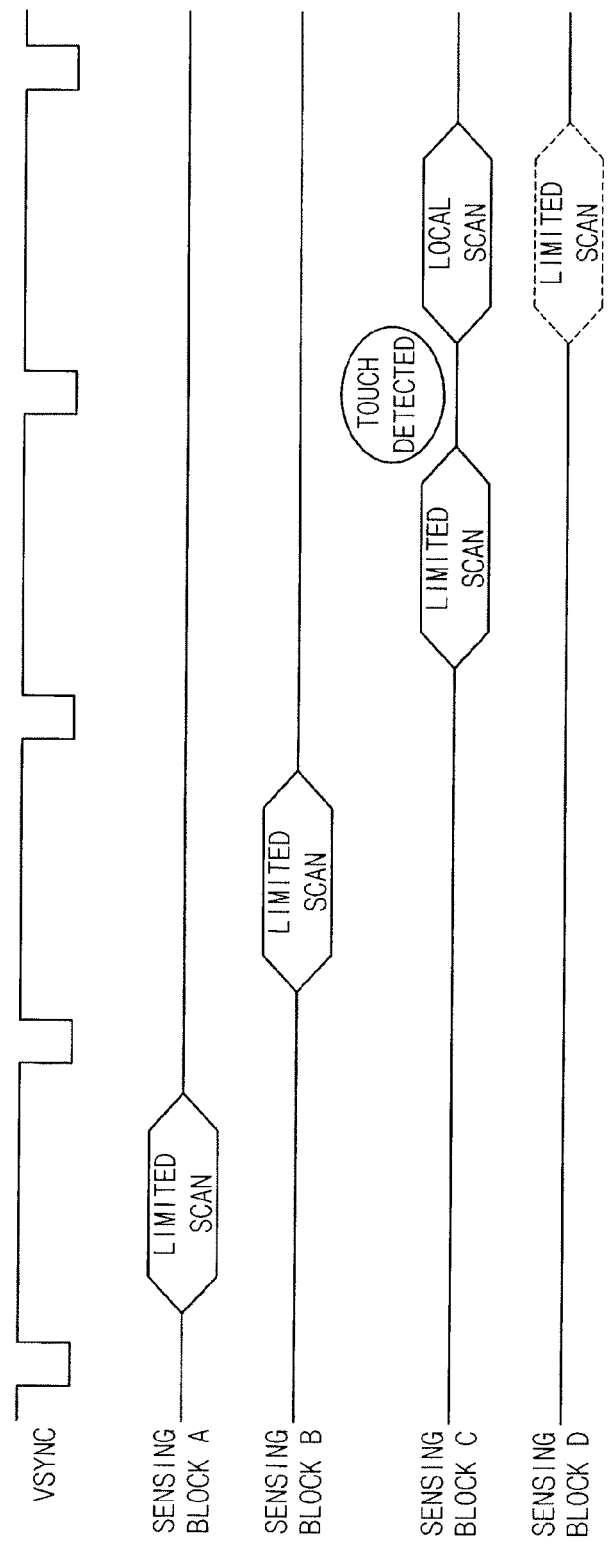
FIG. 14 illustrates a timing diagram of an operation of a touch panel included in a display device of FIG. 13.

FIG. 14 is a timing diagram for describing an operation of the touch panel 850 in the display device 800 of FIG. 13.

Referring to FIGS. 13 and 14, the touch panel 850 may operate in synchronization with a vertical synchronization signal (VSYNC) for the display panel 810, and a period of the touch frame for the touch panel 850 may be the same as (or in proportion to) a period of a display frame for the display panel 810.

A portion of a plurality of sensing blocks 851, 853, 855 and 857 may perform a limited scan in each touch frame. For example, the first sensing block 851 may perform the limited scan in a first touch frame, the second sensing block 853 may perform the limited scan in a second touch frame, and the third sensing block 855 may perform the limited scan in a third touch frame. If the third sensing block 855 senses a touch in the third touch frame, the third sensing block 855 may perform a local scan in a fourth touch frame. Further, in some example embodiments, the fourth sensing block 857 may perform the limited scan in the fourth touch frame.

Figure 15:
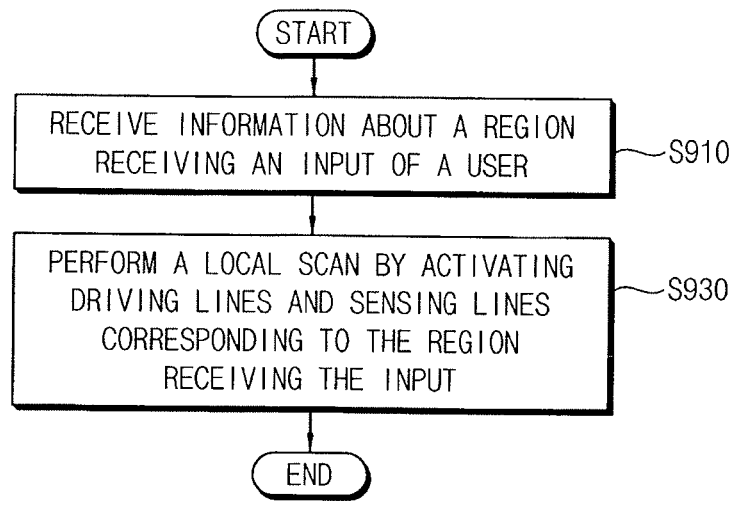
FIG. 15 illustrates a flow chart of a method of operating a touch panel in accordance with example embodiments.

FIG. 15 is a flow chart illustrating a method of operating a touch panel in accordance with example embodiments.

Referring to FIG. 15, a touch controller may receive information about a region receiving an input of a user from an external host (e.g., an application processor). For example, the region receiving the input of the user may be a region displaying a user interface, e.g., a button, a scroll bar, a menu, an icon, a character, etc. In some example embodiments, the information about the region may represent a location of the user interface. In other example embodiments, the information about the region may include driving line information that represents at least one driving line located at the region receiving the input and sensing line information that represents at least one sensing line located at the region receiving the input.

The touch controller may control a touch panel to perform a local scan that detects a position of a touch by the user based on the information about the region (S930). For example, the touch controller may control the touch panel to activate the at least one driving line and the at least one sensing line corresponding to the region receiving the input.

As described above, in the method of operating the touch panel according to example embodiments, the touch panel may perform the local scan for the region displaying the user interface, thereby reducing scan time and power consumption of the touch panel.

Figure 16A:
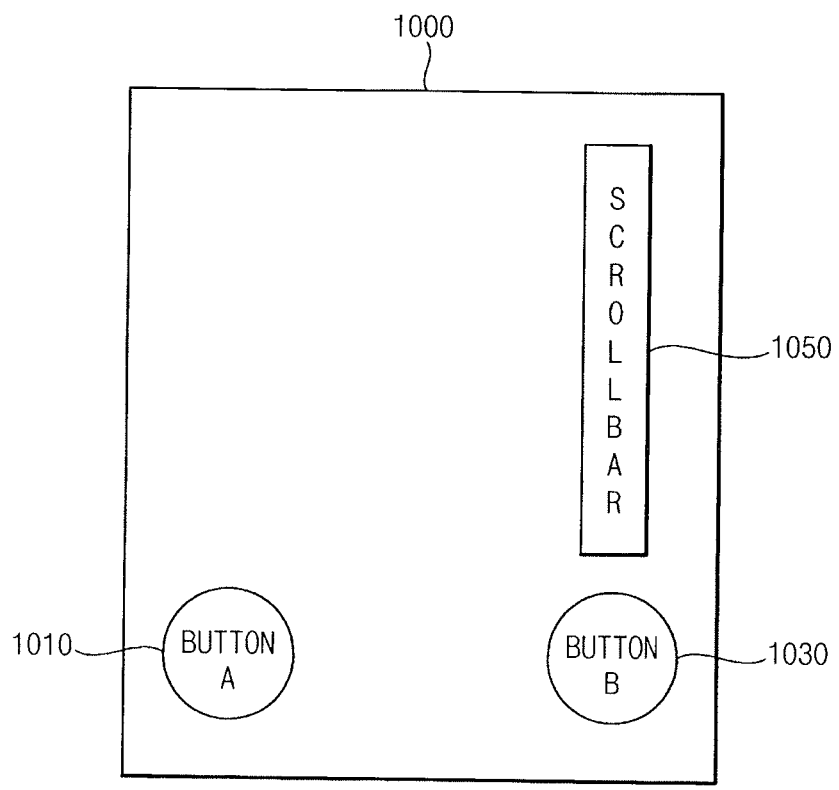
FIGS. 16A and 16B illustrate diagrams of an example of a display panel and a touch panel performing a method of FIG. 15.
Figure 16B:
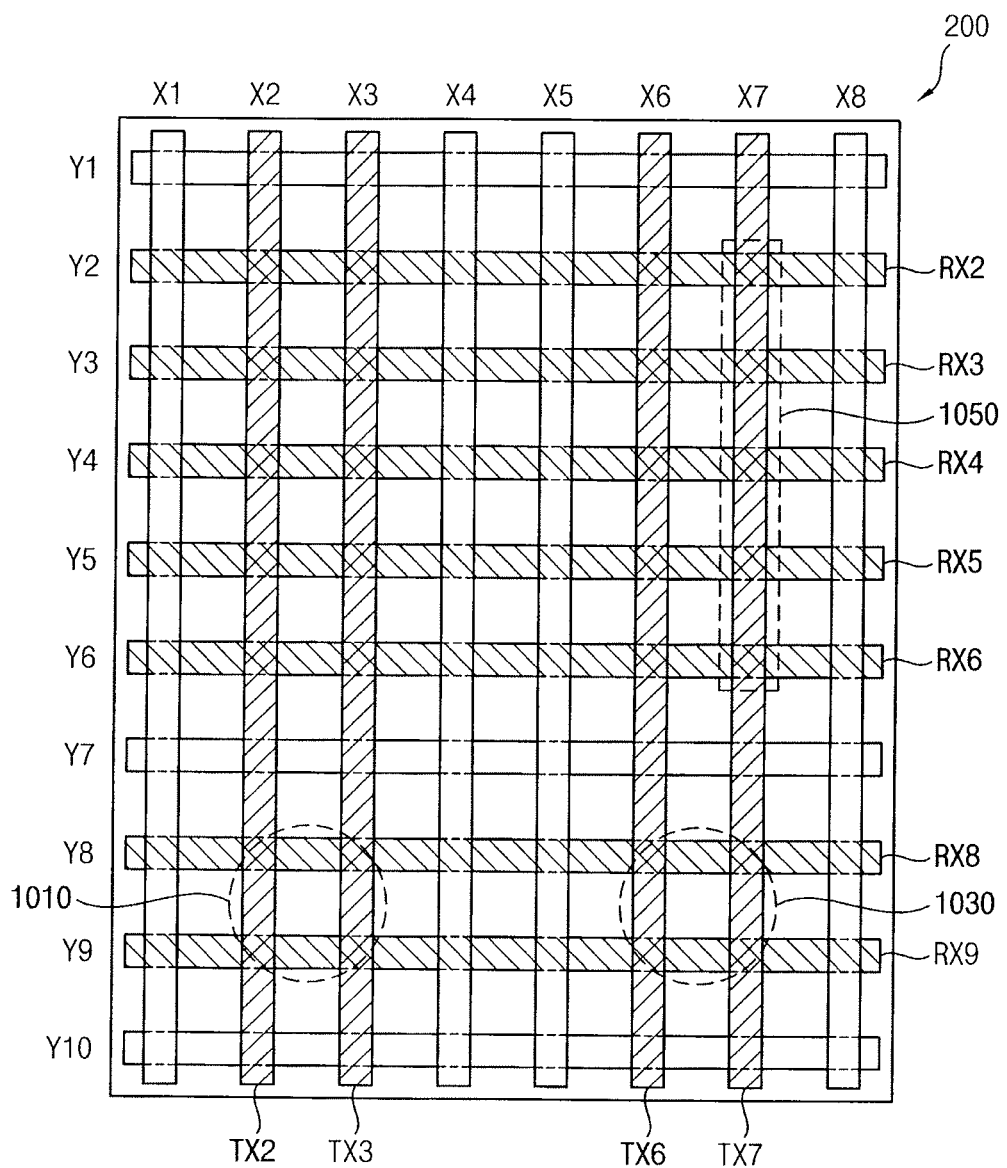

FIGS. 16A and 16B are diagrams illustrating an example of a display panel and a touch panel performing the method of FIG. 15.

Referring to FIG. 16A, a display panel 1000 may display a first button 1010, a second button 1030, and a scroll bar 1050. The first button 1010, the second button 1030, and the scroll bar 1050 may be user interfaces to receive input actions, e.g., a tap operation, a click operation, a drag operation, etc., from a user.

Referring to FIG. 16B, the touch panel 200 may perform a local scan for a region of the user interface. For example, to perform the local scan, the touch panel 200 may activate driving lines TX2 and TX3 corresponding to a region displaying the first button 1010, driving lines TX6 and TX7 corresponding to a region displaying the second button 1030, and a driving line TX7 corresponding to a region displaying the scroll bar 1050, and may activate sensing lines RX8 and RX9 corresponding to the region displaying the first button 1010, sensing lines RX8 and RX9 corresponding to the region displaying the second button 1030, and sensing lines RX2, RX3, RX4, RX5 and RX6 corresponding to the region displaying the scroll bar 1050.

As described above, in a method of operating the touch panel 200 according to example embodiments, the touch panel 200 may perform the local scan for the region displaying the user interface 1010, 1030, and 150, thereby reducing scan time and power consumption of the touch panel 200.

Figure 17:
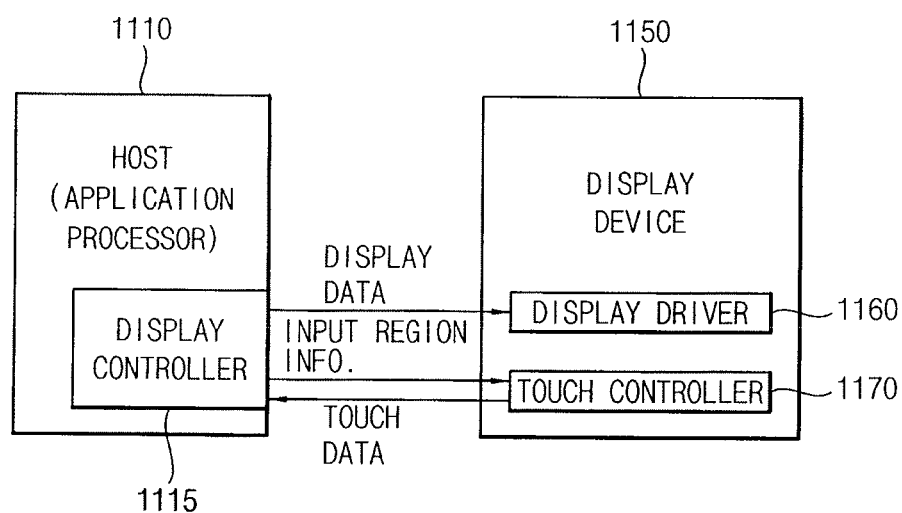
FIG. 17 illustrates a block diagram of a host and a display device performing a method of FIG. 15.

FIG. 17 is a block diagram illustrating a host and a display device performing the method of FIG. 15.

Referring to FIG. 17, a display controller 1115 included in a host 1110 may provide a display driver 1160 included in a display device 1150 with display data, and may provide a touch controller 1170 included in the display device 1150 with information about a region receiving an input from a user. For example, the host 110 may be a mobile system-on-chip (SOC), an application processor, a media processor, a microprocessor, a central processing unit (CPU), or the like.

The touch controller 1170 may control a touch panel to perform a local scan by activating driving lines and sensing lines corresponding to the region receiving the input from the user. Accordingly, since the display device 1150 performs the local scan for the region receiving the input, scan time and power consumption of the touch panel may be reduced.

Figure 18:
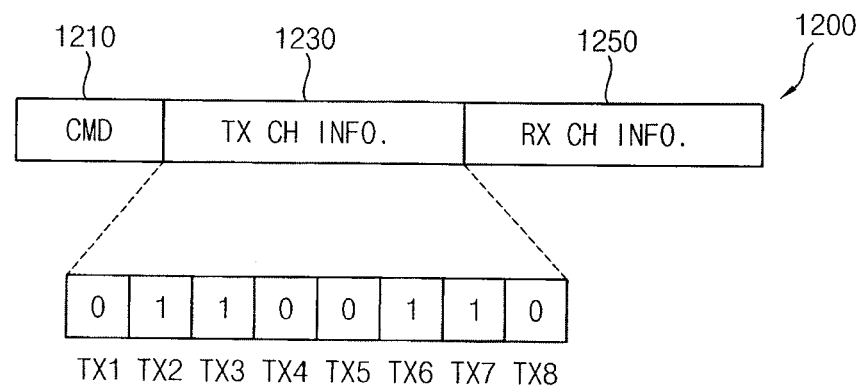
FIG. 18 illustrates a diagram of an example of a command provided from a host to a display device.

FIG. 18 is a diagram illustrating an example of a command provided from a host to a display device.

Referring to FIG. 18, information about a region receiving an input from a user may be provided in a form of a command 1200. The command 1200 may include a command type field 1210, a driving line information field 1230, and a sensing line information field 1250.

The command type field 1210 may contain a predetermined value indicating that the command 1200 is a command related to the information about the region receiving the input, the driving line information field 1230 may contain information about driving lines corresponding to the region receiving the input, and the sensing line information field 1250 may contain information about sensing lines corresponding to the region receiving the input. In some example embodiments, the driving line information field 1230 may include a driving line bitmap, and the sensing line information field 1250 may include a sensing line bitmap. Each bit of the driving line bitmap may correspond to one driving line, and may have a value of "1" if the corresponding driving line is located at the region receiving the input. Further, each bit of the sensing line bitmap may correspond to one sensing line, and may have a value of "1" if the corresponding sensing line is located at the region receiving the input.

Figure 19:
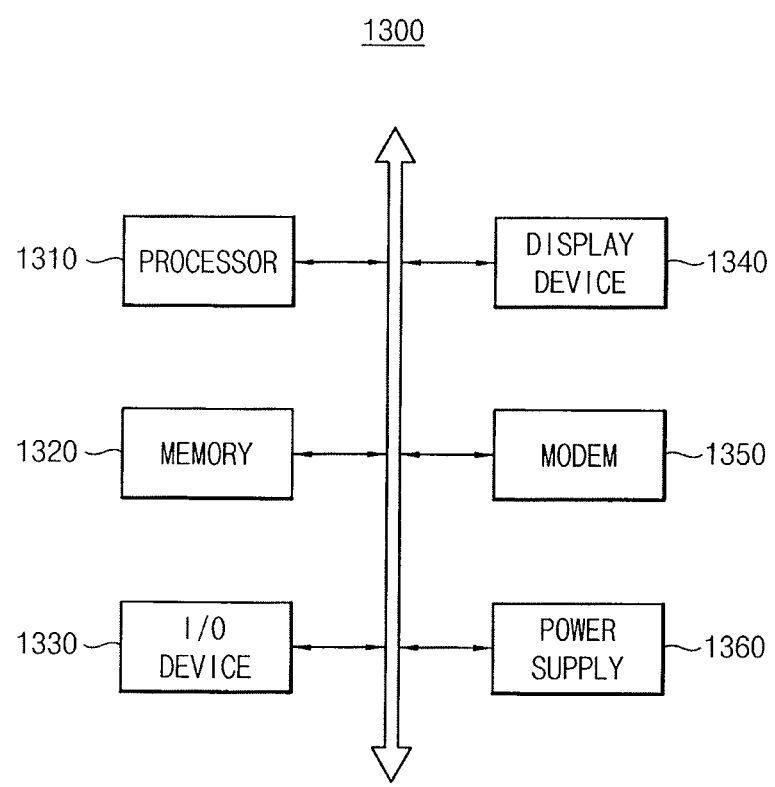
FIG. 19 illustrates a block diagram of a computing system including a display device in accordance with example embodiments.

FIG. 19 is a block diagram illustrating a computing system including a display device in accordance with example embodiments.

Referring to FIG. 19, a computing system 1300 may include a processor 1310, a memory device 1320, an input/output device 1330, a display device 1340, a modem 1350, and a power supply 1360.

The processor 1310 may perform specific calculations or tasks. For example, the processor 1310 may be a mobile SOC, an application processor, a media processor, a microprocessor, a CPU, or the like. The processor 1310 may be coupled to the memory device 1320 via a bus, e.g., an address bus, a control bus, and/or a data bus. For example, the memory device 1320 may be implemented by a dynamic random access memory (DRAM), a mobile DRAM, a static random access memory (SRAM), a phase random access memory (PRAM), a ferroelectric random access memory (FRAM), a resistive random access memory (RRAM), a magnetic random access memory (MRAM), or the like. Further, the processor 1310 may be coupled to an extension bus, e.g., a peripheral component interconnect (PCI) bus, and may control the input/output device 1330 including at least one input device, e.g., a keyboard, a mouse, a touch screen, etc., and at least one output device, e.g., a printer, a display device, etc. The display device 1340 may include a touch panel sensing a touch by a user. The touch panel may perform a limited scan, a local scan, and/or a simultaneous limited and local scan, thereby reducing scan time and power consumption of the touch panel.

The processor 1310 may control a storage device, e.g., a solid state drive, a hard disk drive, a CD-ROM, etc., via the extension bus. The modem 1350 may perform wired or wireless communication with an external device. The power supply 1360 may supply power to the computing system 1300. In some example embodiments, the computing system 1300 may further include, e.g., an application chipset, a camera image processor (CIS), etc.

The computing system 1300 may be any computing system including the display device 1340. For example, the computing system 1300 may include a digital television (TV), a three-dimensional TV, a personal computer (PC), a home appliance, a laptop computer, a tablet computer, a mobile phone, a smart phone, a personal digital assistant (PDA), a portable multimedia player (PMP), a digital camera, a music player, a portable game console, a navigation system, etc.

According to example embodiments, the method of operating the touch panel, the touch panel, and the display device may perform a limited scan, a local scan, and/or simultaneous limited and local scans, thereby reducing scan time and power consumption of the touch panel. Further, the method of operating the touch panel, the touch panel, and the display device according to example embodiments may be readily applied to a large display device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of operating a touch panel including a plurality of driving lines and a plurality of sensing lines, the method comprising:
   performing a first limited scan by activating only a first portion of the plurality of driving lines and only a first portion of the plurality of sensing lines, such that a first coarse position of a first touch by a user is detected;
   when the first coarse position of the first touch is detected by the first limited scan, performing a first local scan by activating only driving lines and sensing lines including ones adjacent to the detected first coarse position of the first touch, such that a first fine position of the first touch by the user is detected, wherein at least one of the driving lines and at least one of the sensing lines activated during the first local scan are activated during the first limited scan, wherein in performing the first limited scan:
   the activated driving lines in the first portion are spaced at a same interval,
   the activated sensing lines in the first portion are spaced at the same interval,
   at least one non-activated driving line is between each pair of adjacent activated driving lines, and
   at least one non-activated sensing line is between each pair of adjacent activated sensing lines; and
   performing a second limited scan simultaneously with the first local scan to detect a second coarse position of a second touch simultaneously with the first fine position of the first touch by further activating a second portion of the driving lines and a second portion of the sensing lines.

2. The method as claimed in claim 1, wherein performing the first limited scan includes:
   activating M driving lines of N driving lines among the plurality of driving lines, where N is an integer greater than 1, and M is an integer greater than 0 and smaller than N; and
   activating K sensing lines of L sensing lines among the plurality of sensing lines, where L is an integer greater than 1, and K is an integer greater than 0 and smaller than L.

3. The method as claimed in claim 1, wherein performing the first limited scan includes:
   activating only odd-numbered driving lines among the plurality of driving lines; and
   activating only odd-numbered sensing lines among the plurality of sensing lines.

4. The method as claimed in claim 1, wherein performing the first limited scan includes:
   activating only even-numbered driving lines among the plurality of driving lines; and
   activating only even-numbered sensing lines among the plurality of sensing lines.

5. The method as claimed in claim 1, wherein performing the first limited scan includes:
   activating only odd-numbered driving lines among the plurality of driving lines in an odd-numbered touch frame;
   activating only odd-numbered sensing lines among the plurality of sensing lines in the odd-numbered touch frame;
   activating only even-numbered driving lines among the plurality of driving lines in an even-numbered touch frame; and
   activating only even-numbered sensing lines among the plurality of sensing lines in the even-numbered touch frame.

6. The method as claimed in claim 1, wherein performing the first local scan includes:
   activating a first driving line corresponding to the first coarse position of the first touch and at least one second driving line adjacent to the first driving line among the plurality of driving lines; and
   activating a first sensing line corresponding to the first coarse position of the first touch and at least one second sensing line adjacent to the first sensing line among the plurality of sensing lines.

7. The method as claimed in claim 1, further comprising performing a second local scan subsequent to the first local scan by activating driving lines and sensing lines adjacent to the first fine position of the first touch, such that a changed fine position of the first touch is detected.

8. The method as claimed in claim 7, wherein performing the second local scan detects a drag operation.

9. The method as claimed in claim 1, wherein performing the first limited scan includes:
   activating M driving lines of N driving lines among the plurality of driving lines, where N is an integer greater than 1, and M is an integer greater than 0 and smaller than N; and
   activating K sensing lines of L sensing lines among the plurality of sensing lines, where L is an integer greater than 1, and K is an integer greater than 0 and smaller than L.

10. The method as claimed in claim 1, wherein performing the simultaneous limited and local scans includes:
    activating the second portion of the plurality of driving lines, a first driving line corresponding to the first coarse position of the first touch, and at least one second driving line adjacent to the first driving line among the plurality of driving lines; and
    activating the second portion of the plurality of sensing lines, a first sensing line corresponding to the first coarse position of the first touch, and at least one second sensing line adjacent to the first sensing line among the plurality of sensing lines.

11. The method as claimed in claim 1, further comprising performing a third limited scan simultaneously with a second local scan to detect a third coarse position simultaneously with a second fine position by further activating driving lines adjacent to the second coarse position, a third portion of the driving lines, sensing lines adjacent to the second coarse position, and a third portion of the sensing lines.

12. The method as claimed in claim 11, wherein performing the third limited scan simultaneously with the second local scan includes sensing a multi-touch of the first touch and the second touch.

13. A touch panel, comprising:
    a plurality of driving lines extending in a first direction; and a plurality of sensing lines extending in a second direction substantially perpendicular to the first direction, wherein the touch panel is to activate only a first portion of the plurality of driving lines and only a first portion of the plurality of sensing lines to perform a first limited scan to detect a first coarse position of a first touch by a user, wherein, when the first coarse position of the first touch is detected by the first limited scan, the touch panel is to activate only driving and sensing lines including ones adjacent to the first coarse position of the first touch to perform a first local scan to detect a first fine position of the first touch, wherein at least one of the driving lines and at least one of the sensing lines activated during the first local scan are activated during the first limited scan, and wherein in the first limited scan:

the activated driving lines in the first portion are spaced at a same interval, the activated sensing lines in the first portion are spaced at the same interval, at least one non-activated driving line is between each pair of adjacent activated driving lines, and at least one non-activated sensing line is between each pair of adjacent activated sensing lines, wherein the touch panel is to perform a second limited scan simultaneously with the first local scan to detect a second coarse position of a second touch simultaneously with the first fine position of the first touch by further activating a second portion of the driving lines and a second portion of the sensing lines.

14. A display device, comprising:
a display panel to display an image;
a display driver to drive the display panel;
the touch panel as claimed in claim 13; and
a touch controller to drive the touch panel.

15. The display device as claimed in claim 14, wherein the display driver and the touch controller are separate chips.

16. The display device as claimed in claim 14, wherein the display driver and the touch controller are in a single chip.

17. The display device as claimed in claim 14, wherein the touch controller includes a transmitting block to apply a driving pulse to the plurality of driving lines, and a receiving block to receive outputs from the plurality of sensing lines, the transmitting block of the touch controller being within the display driver.

18. A method of operating a touch panel including a plurality of touch sensor cells arranged in a matrix form having a plurality of rows and a plurality of columns, the method comprising:

performing a first limited scan that detects a first coarse position of a first touch by a user by activating a first portion of the plurality of touch sensor cells;

when the first coarse position of the first touch is detected by the first limited scan, performing a first local scan that detects a first fine position of the first touch by activating touch sensor cells which include touch sensor cells adjacent to the first coarse position of the first touch among the plurality of touch sensor cells, wherein in the first limited scan:

the activated touch sensor cells in the first portion are spaced at a same interval along a first direction, the activated touch sensor cells in the first portion are spaced at the same interval along a second direction substantially perpendicular to the first direction, at least one non-activated touch sensor cell is between each pair of adjacent activated touch sensor cells along the first direction, and at least one non-activated touch sensor cell is between each pair of adjacent activated touch sensor cells along the second direction, and wherein at least one of the touch sensor cells activated during the first local scan are activated during the first limited scan; and performing a second limited scan simultaneously with the first local scan, such that a second coarse position of a second touch by the user is detected simultaneously with the first fine position of the first touch, by further activating a second portion of the touch sensor cells with the touch sensor cells adjacent to the first coarse position of the first touch.

* * * * *